United States Patent [19]

Harumatsu et al.

[11] Patent Number: 4,991,043
[45] Date of Patent: Feb. 5, 1991

[54] TAPE CASSETTE LOADING SYSTEM

[75] Inventors: Mitsuo Harumatsu, Tokyo; Hiromichi Hirayama, Yokosuka; Mitsuhiko Hara, Kawasaki; Masato Mihara, Hiratsuka, all of Japan

[73] Assignee: Victor Company of Japan, Ltd., Yokohama, Japan

[21] Appl. No.: 256,910

[22] Filed: Oct. 12, 1988

[30] Foreign Application Priority Data

Oct. 15, 1987 [JP] Japan .................................. 62-260584

[51] Int. Cl.$^5$ ........................ G11B 5/008; G11B 15/00
[52] U.S. Cl. .................................................... 360/94
[58] Field of Search ........................ 360/94, 91, 69, 92

[56] References Cited

U.S. PATENT DOCUMENTS

| 4,664,337 | 5/1987 | Shiratori | 360/94 |
| 4,729,046 | 3/1988 | Steipe et al. | 360/94 |
| 4,853,805 | 8/1989 | Baranski | 360/94 |

FOREIGN PATENT DOCUMENTS

| 182658 | 8/1986 | Japan . |
| 182660 | 8/1986 | Japan . |
| 269257 | 11/1986 | Japan . |

Primary Examiner—David J. Severin
Attorney, Agent, or Firm—Michael N. Meller

[57] ABSTRACT

A tape cassette loading system of a video tape recorder comprises a cassette loading mechanism including a cassette tray adapted to accept a standard size tape cassette and a compact size tape cassette, for transporting a tape cassette placed thereon from a eject state located substantially outside of a body of the video tape recorder for placement or removal of the tape cassette horizontally to a closed state in which the tape cassette is completely inside the body of the video tape recorder, then to a compact cassette loading state immediately below the closed state, and then to a standard cassette loading state further below the compact cassette loading state, wherein a reel drive mechanism is movable responsive to the type of the tape cassette on the cassette loading means between a first state and a second state for driving a take up reel and a supply reel of the tape cassette, a tape loading mechanism is movable responsive to the type of the tape cassette on the cassette loading mechanism between a first state for engagement with the standard size tape cassette and a second state for engagement with the compact size tape cassette, for drawing out a magnetic tape from the tape cassette and for loading the magnetic tape on a guide drum of the video tape recorder, and a controller is used for controlling the state of the cassette loading mechanism, reel drive mechanism and the tape loading mechanism responsive to the type of the tape cassette to be loaded.

14 Claims, 40 Drawing Sheets

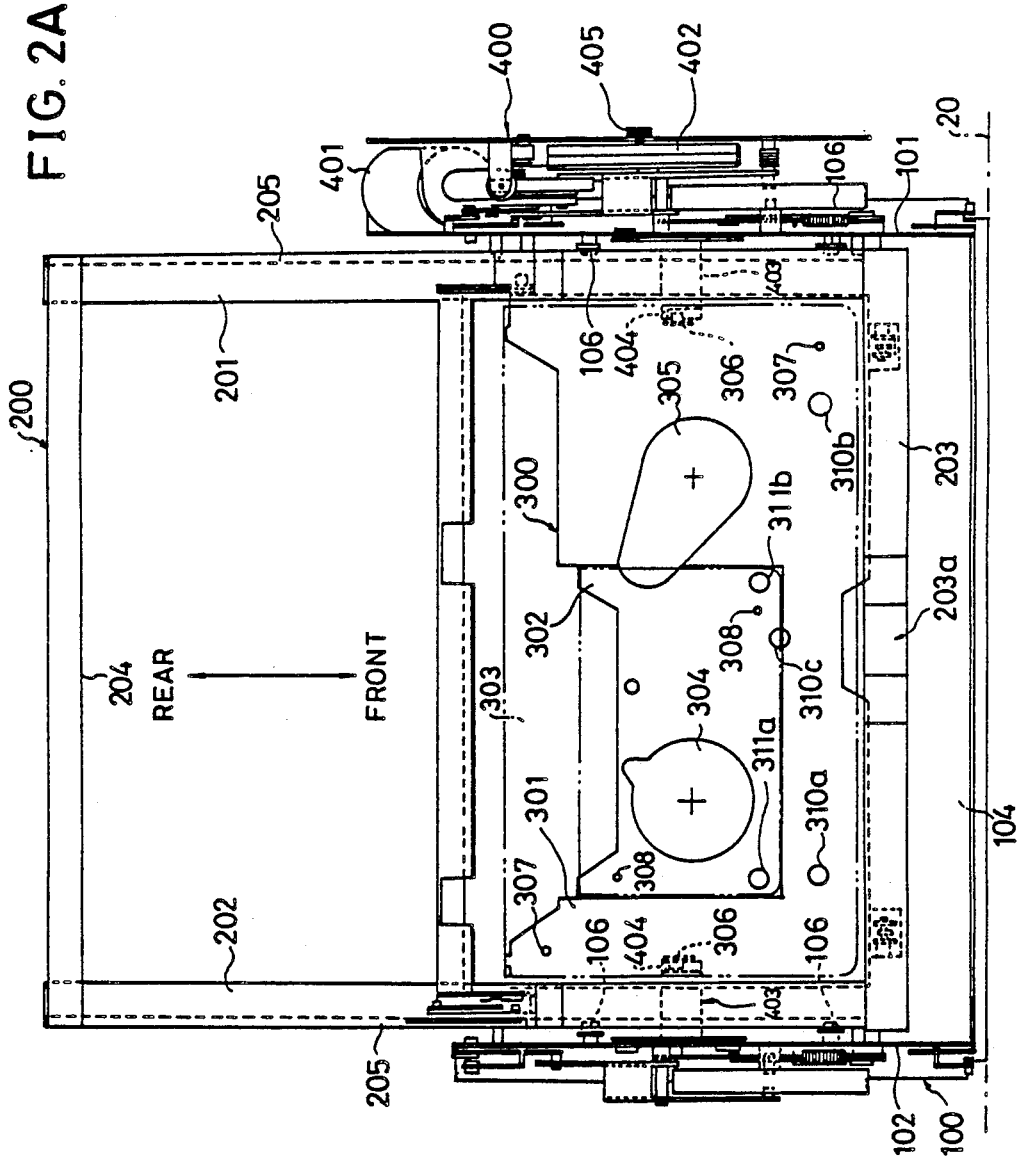

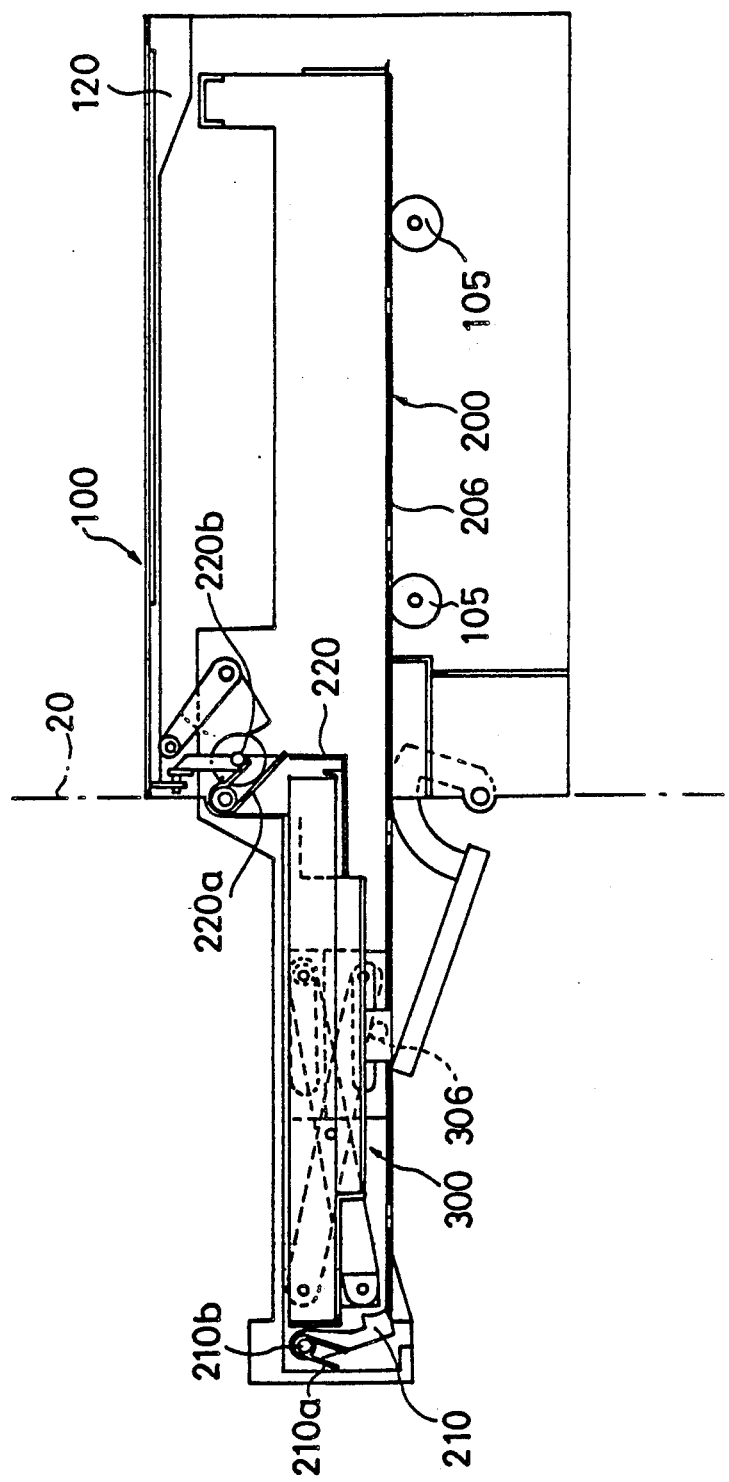

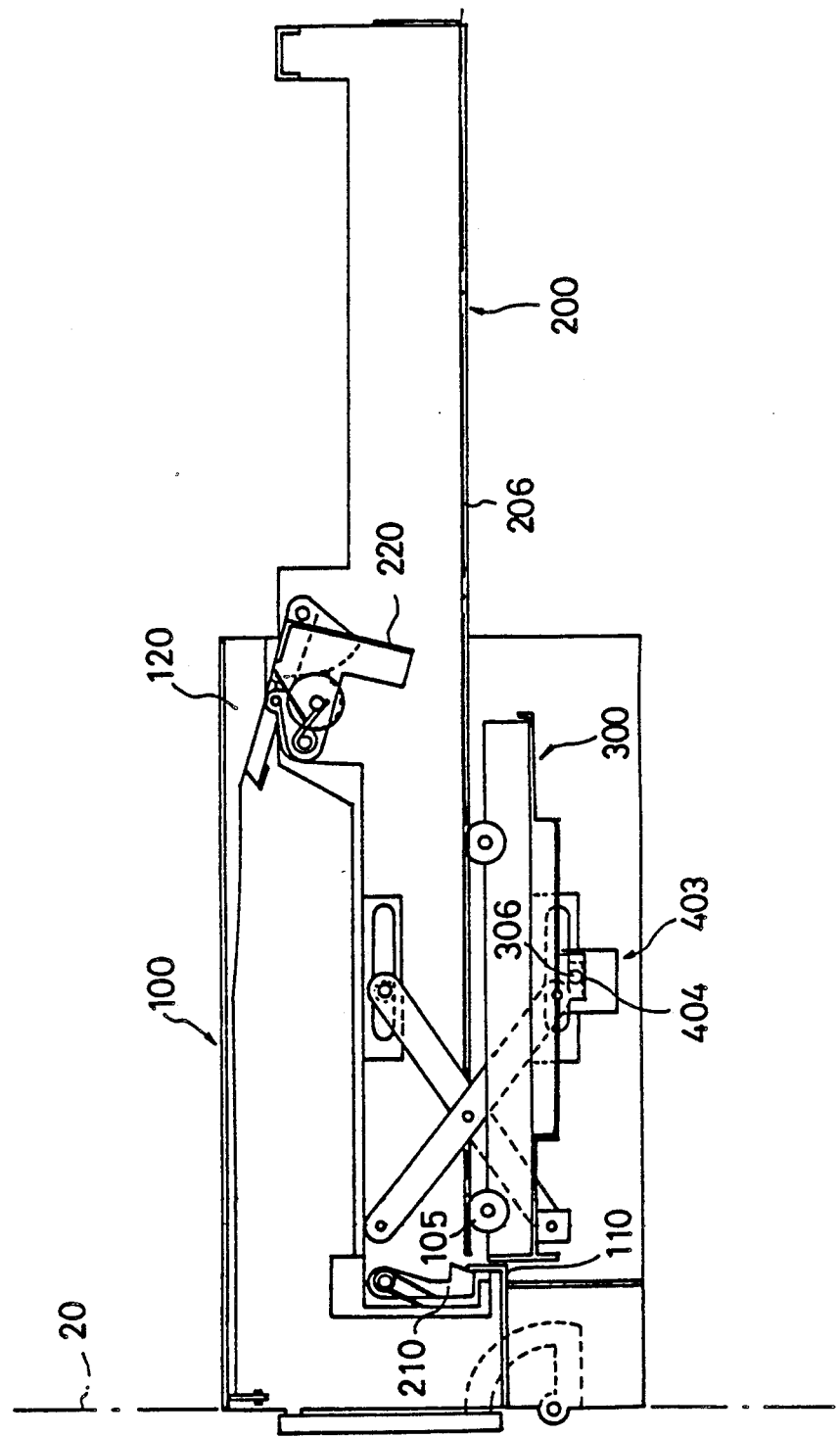

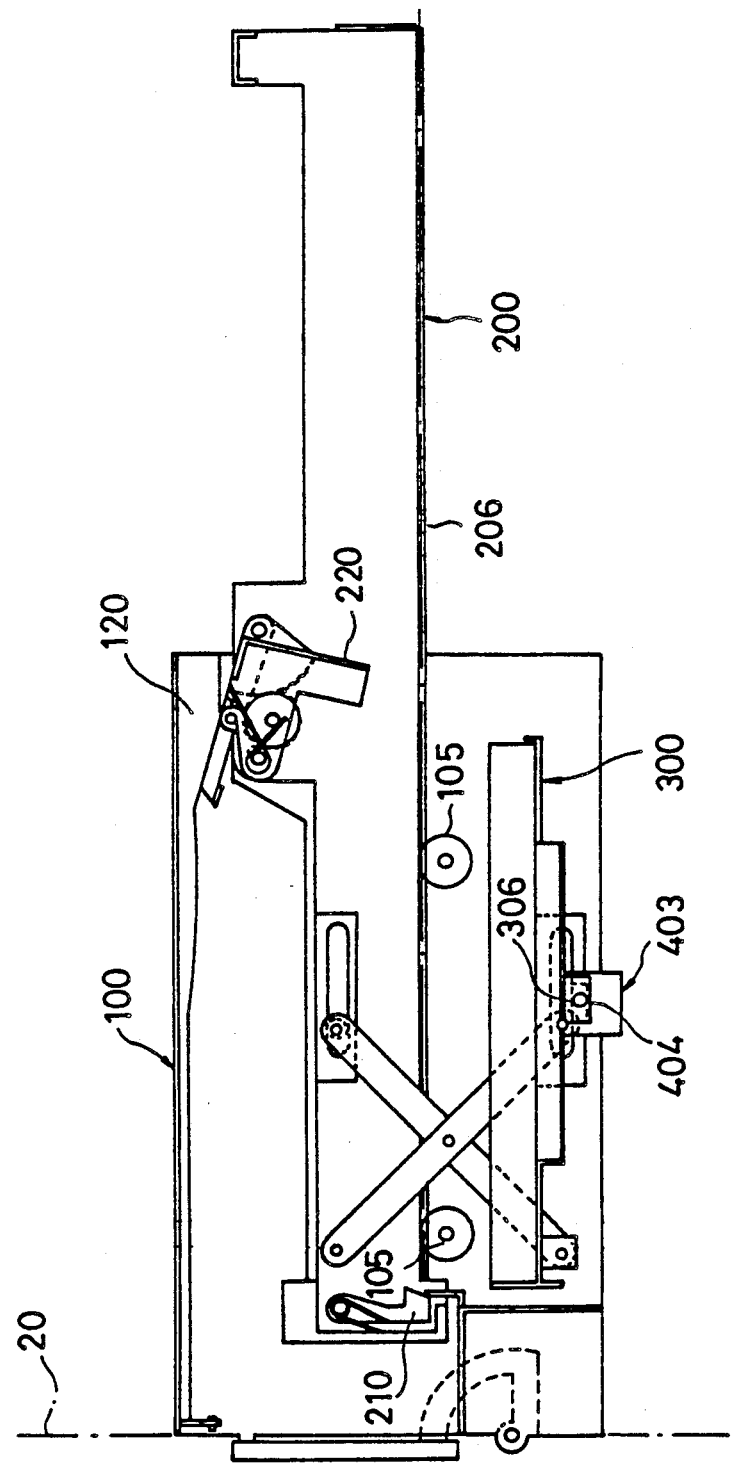

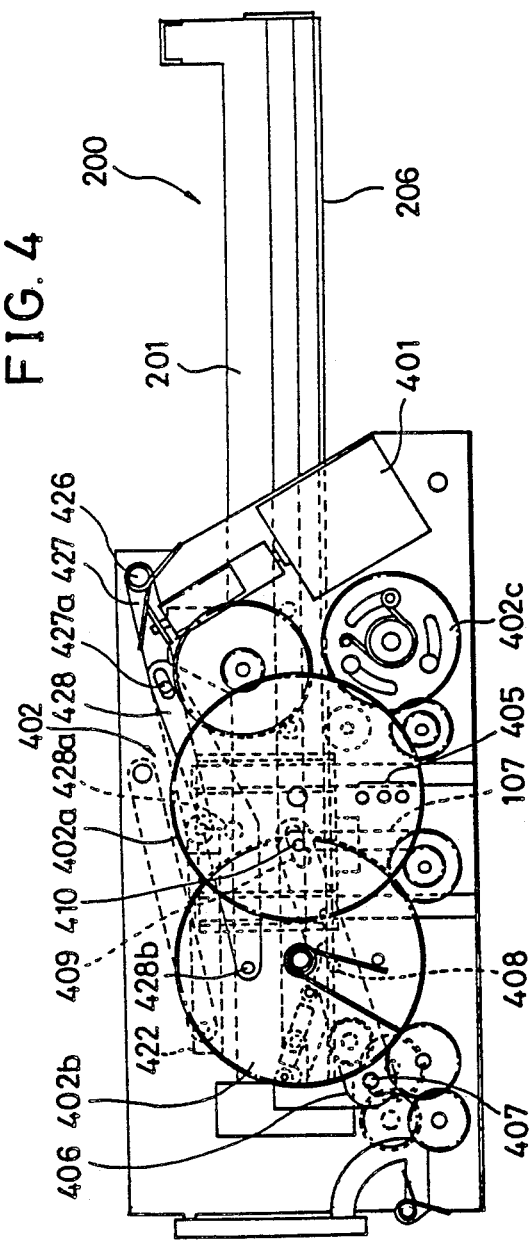
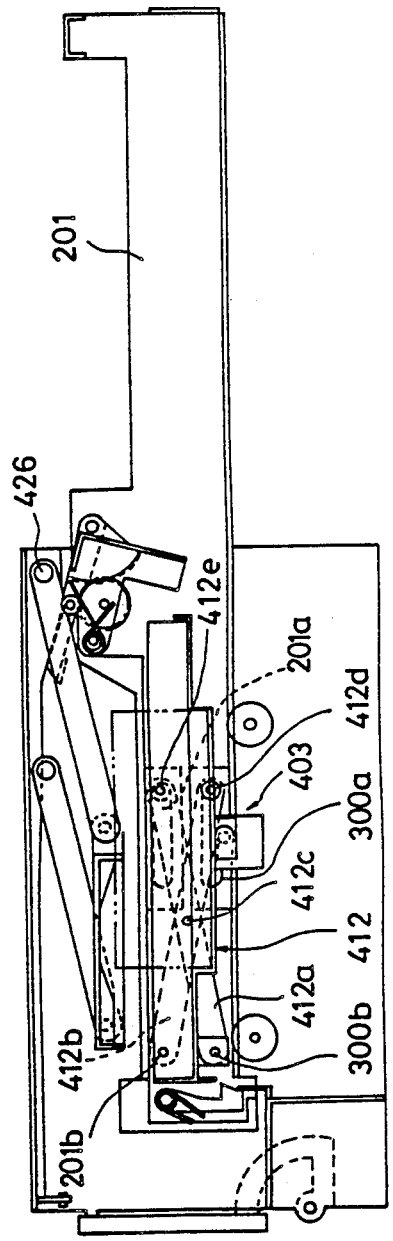
FIG. 4
FIG. 4A
FIG. 4B

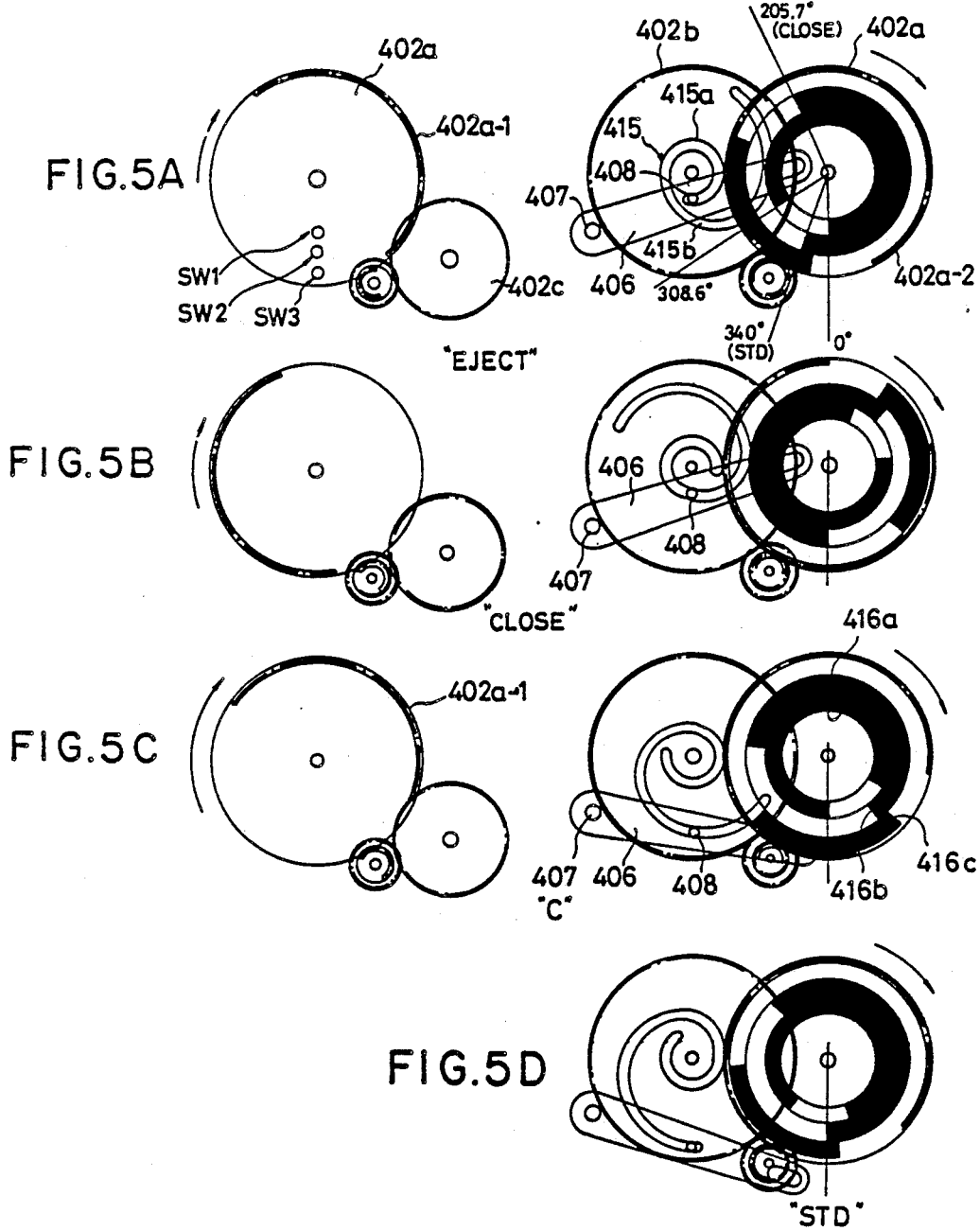

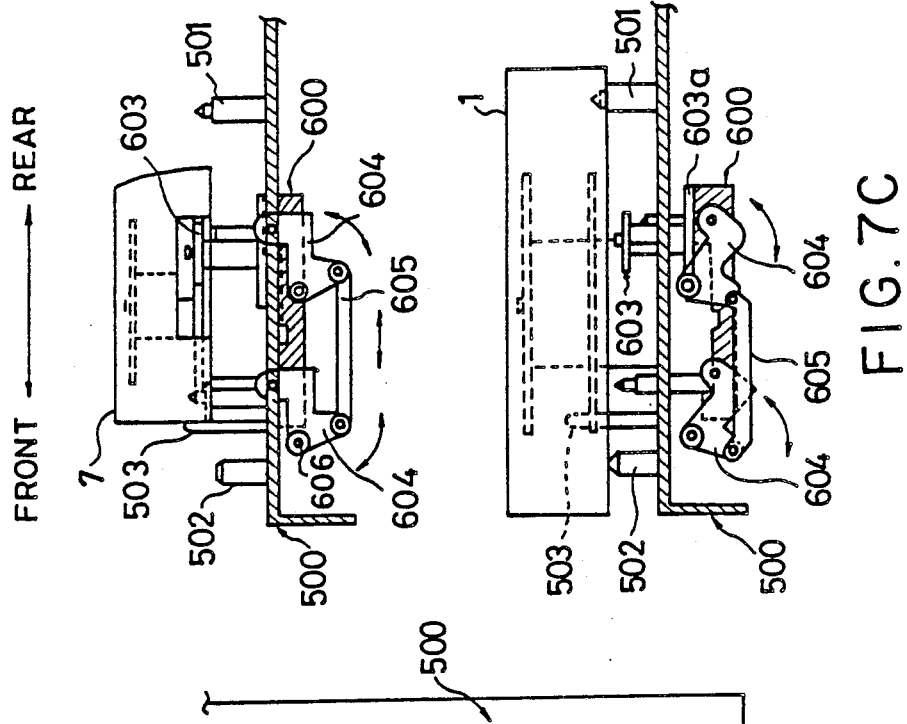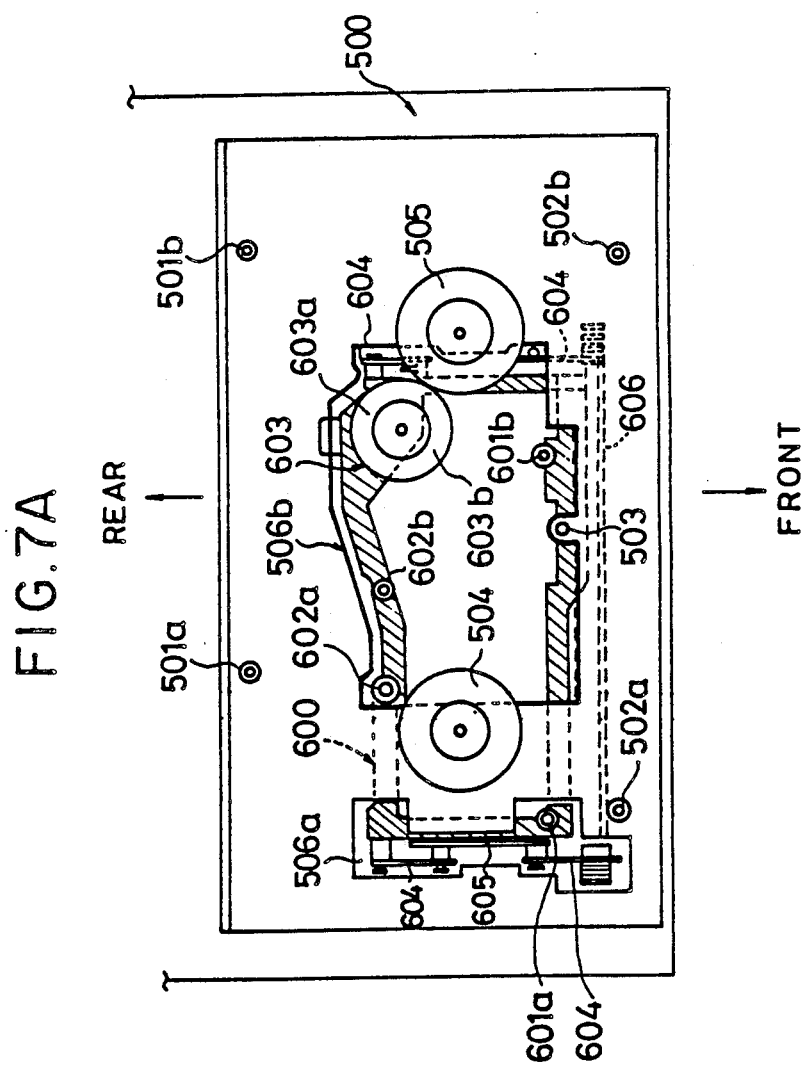

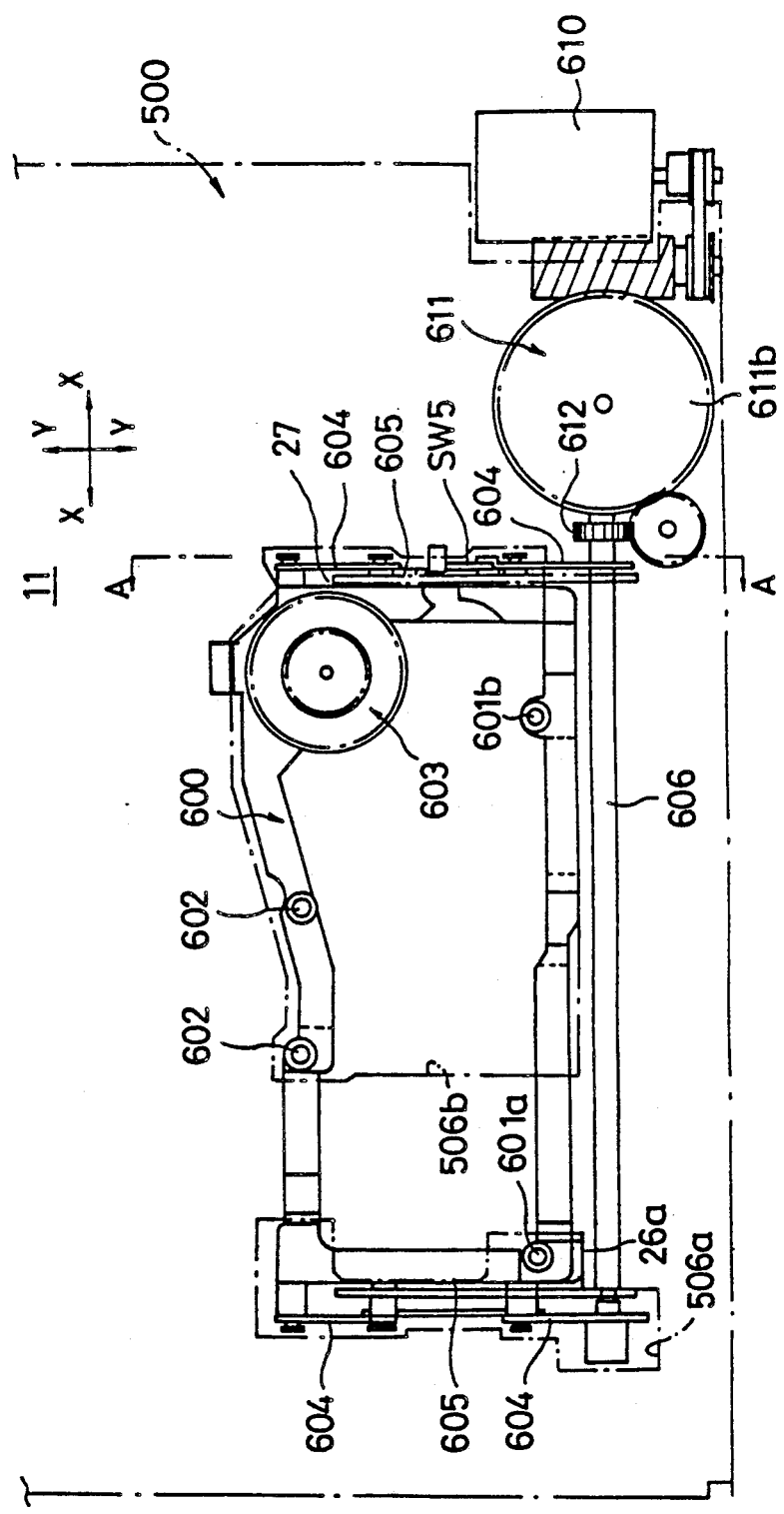

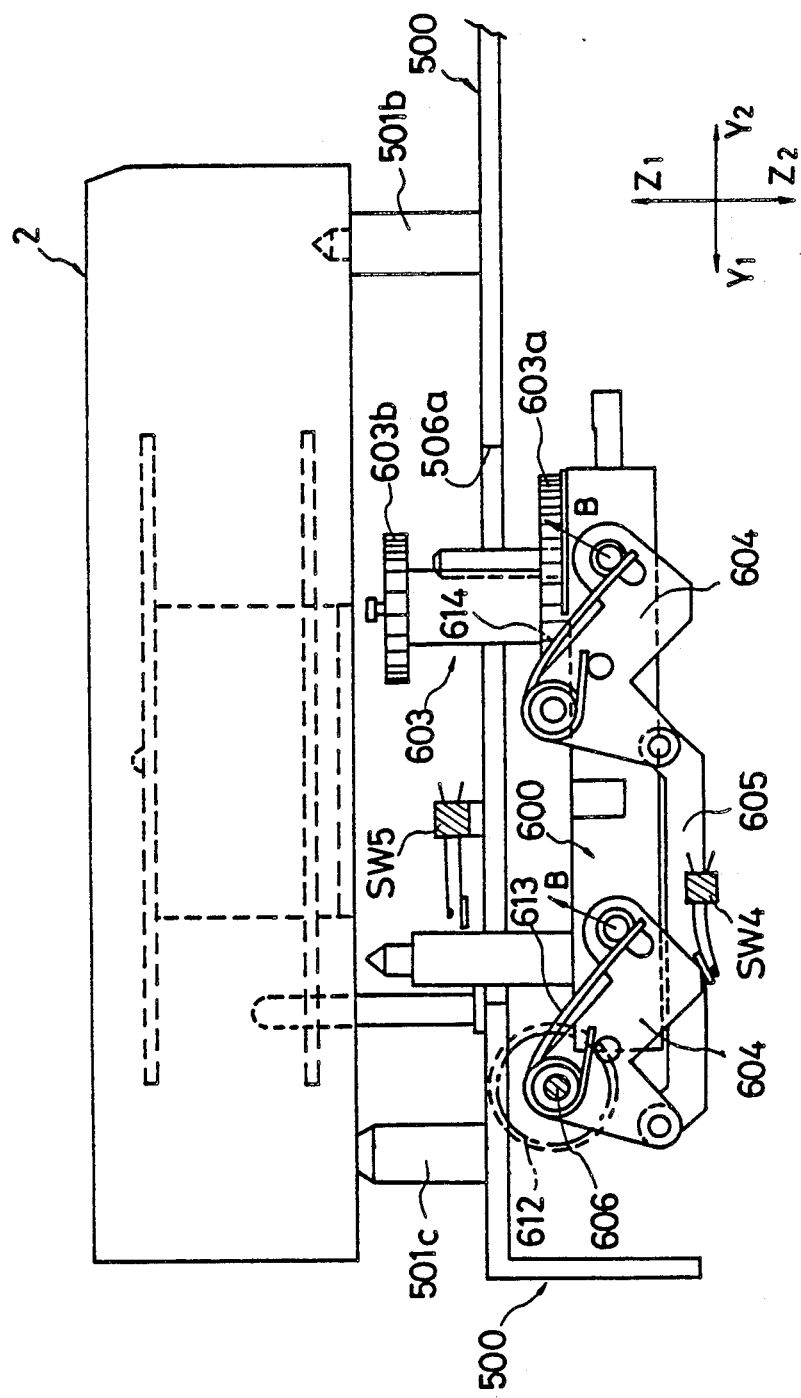

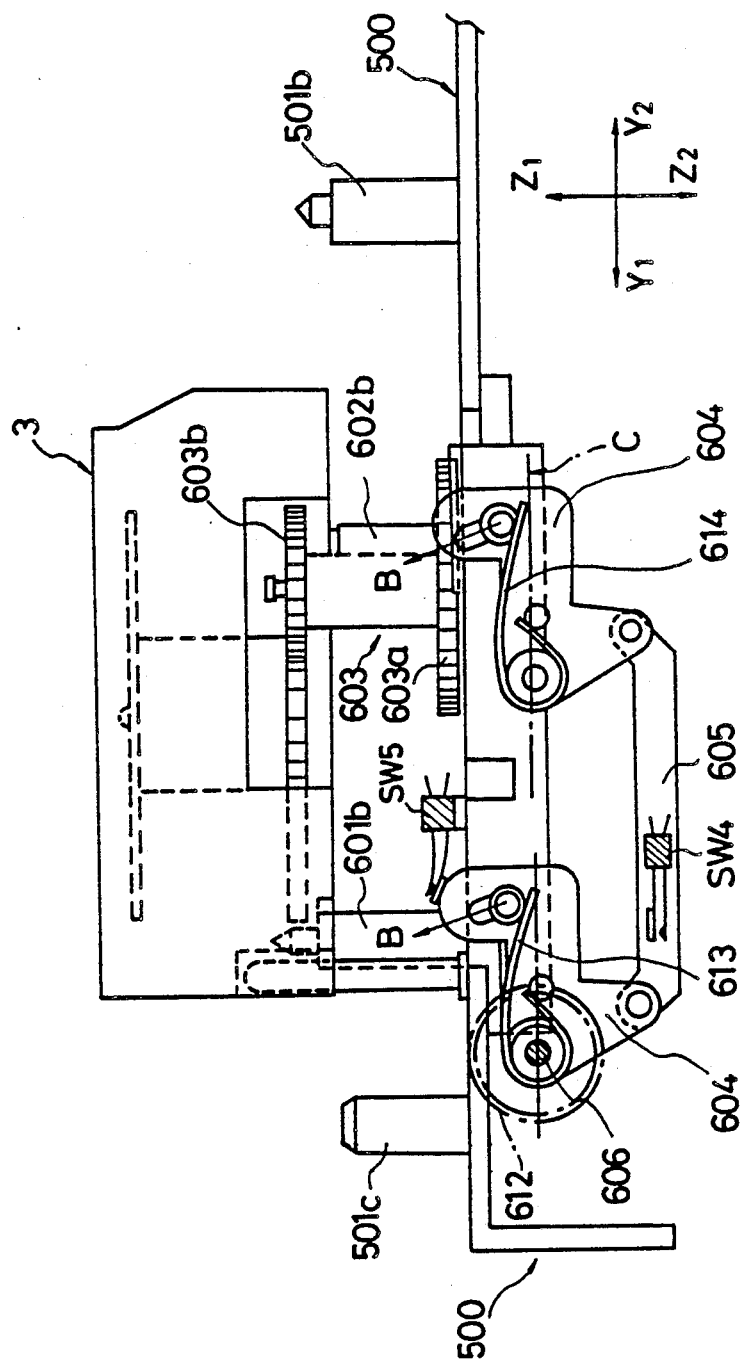

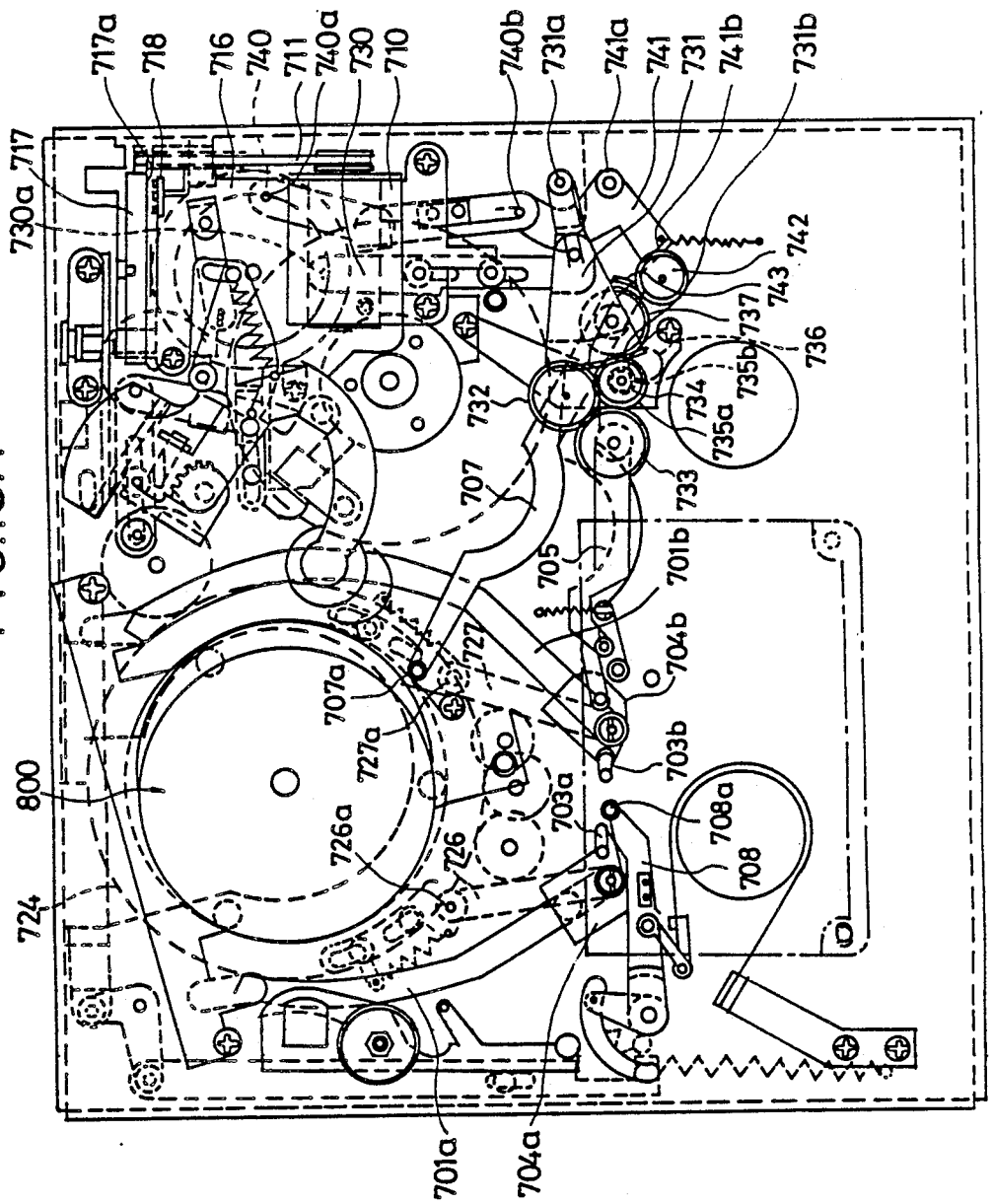

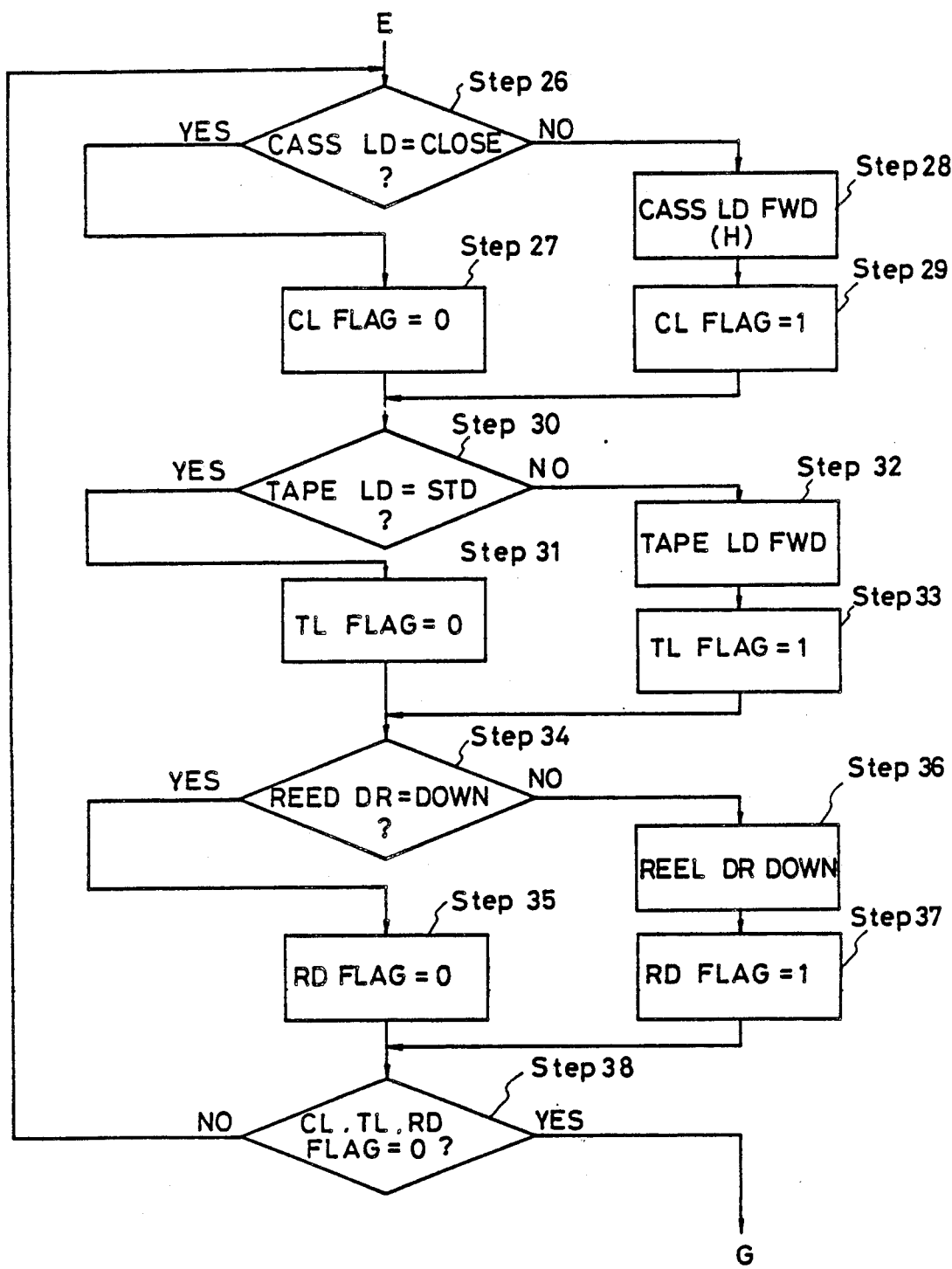

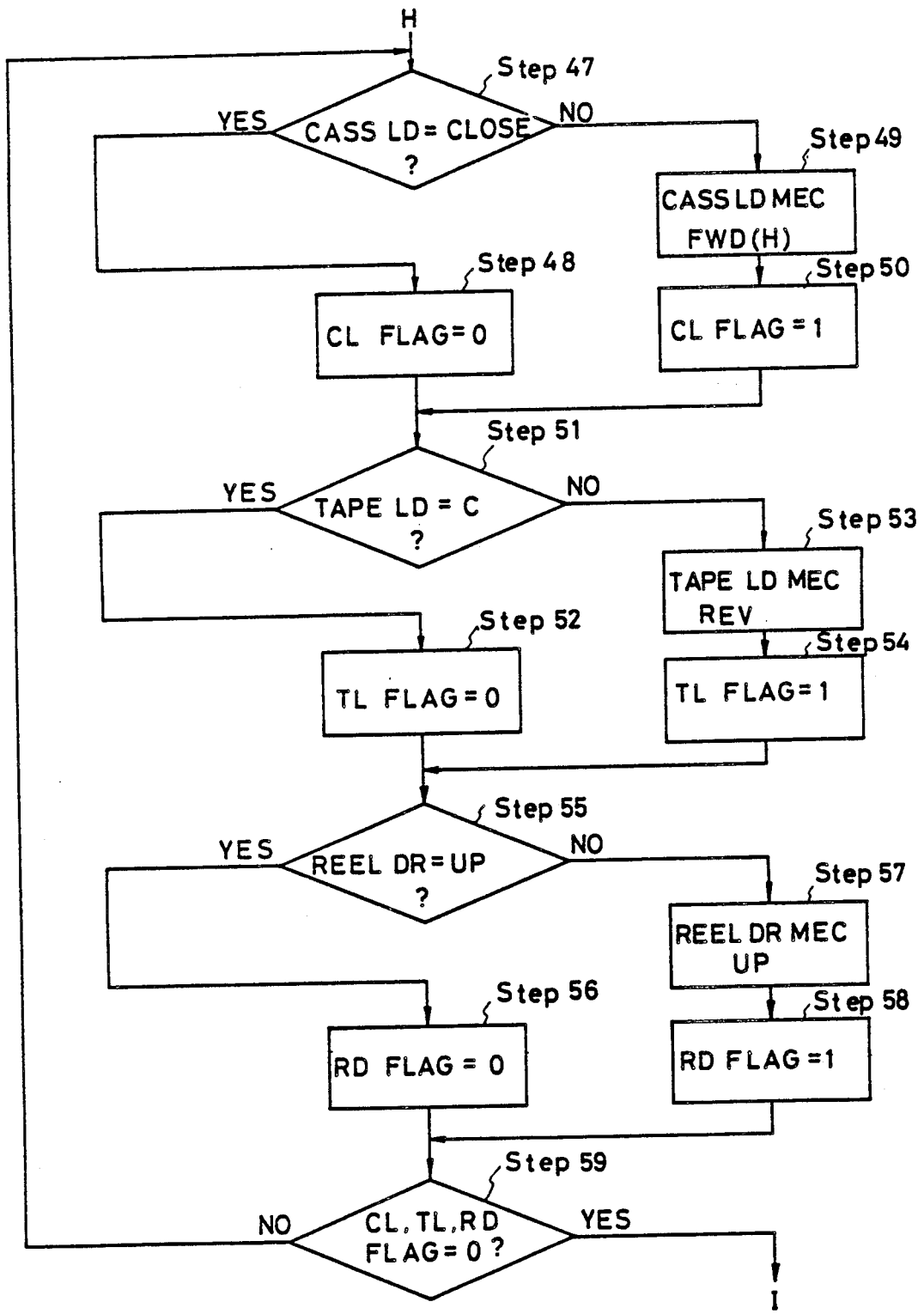

FIG. 21A

```
       NO CASS. CLOSE  ─────  NO CASS. CLOSE
                 ┌EJECT┐   ┌LOAD┐
    KEY OP       │CLOSE│CARR OUT│OPEN│CARR IN│CLOSE│
    STATE
    CASS LD MEC  FWD   H-MOVE
                 REV   ////         H-MOVE
    TAPE LD MEC  FWD   STD CASS POS                    ⎫
                 REV                                   ⎬ NO MOVE
    REEL DR MEC  FWD   STD CASS POS                    ⎭
                 REV
```

FIG. 21B

```
       NO CASS. CLOSE  ─────  STD CASS
                 ┌EJECT┐   ┌LOAD┐
                          STD CASS SET│
    KEY OP       │CLOSE│CARR OUT│OPEN│CARR IN│TRAY DOWN│STD CASS│
    STATE
                 FWD   H-MOVE
    CASS LD MEC  REV   ////         H-MOVE  V-MOVE
    TAPE LD MEC  FWD   STD CASS POS                    ⎫
                 REV                                   ⎬ NO MOVE
    REEL DR MEC  FWD   STD CASS POS                    ⎭
                 REV
```

FIG. 21C

```
       NO CASS. CLOSE  ─────  C-CASS
                 ┌EJECT┐   ┌LOAD┐
                          C-CASS SET│               TRAY DOWN
    KEY OP       │CLOSE│CARR OUT│OPEN│CARR IN│CLOSE│ C-CASS │
    STATE
                 FWD   H-MOVE
    CASS LD MEC  REV   ////         H-MOVE         V-MOVE
    TAPE LD MEC  FWD   STD CASS POS         C-CASS POS
                 REV                ////
    REEL DR MEC  FWD   STD CASS POS  /////  C-CASS POS
                 REV
```

FIG. 23 A
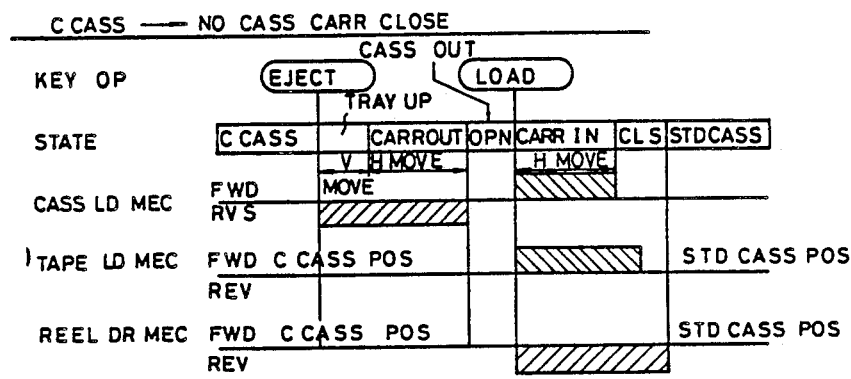
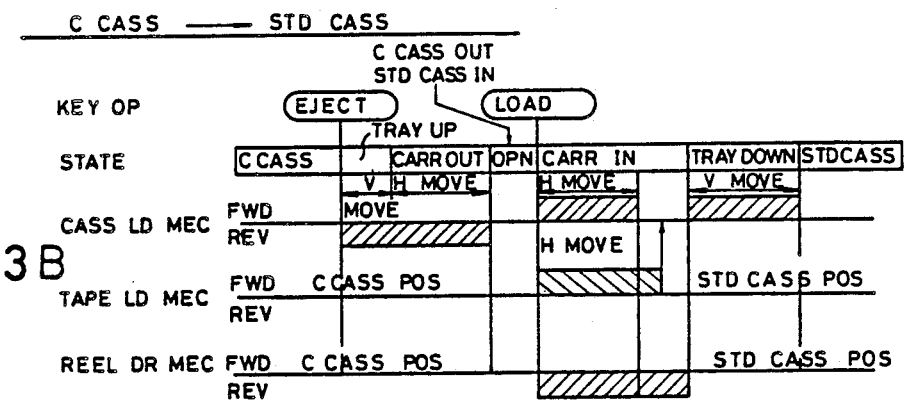
FIG. 23B
FIG. 23C
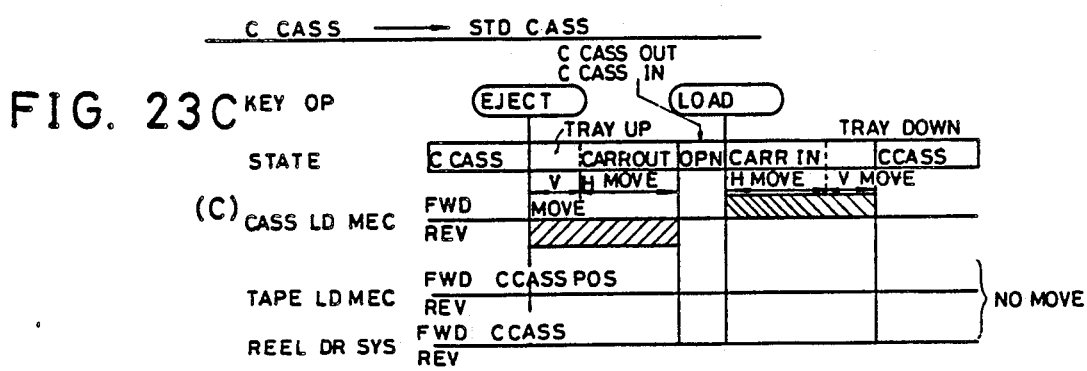

TAPE CASSETTE LOADING SYSTEM

BACKGROUND OF THE INVENTION

The present invention relates in general to a magnetic recording and reproducing apparatus for recording and reproducing an information signal on and from a magnetic tape by means of a recording and reproducing system and in particular to a tape cassette loading system used in a magnetic recording and reproducing apparatus for loading and unloading a magnetic tape contained in a tape cassette on and from the recording and reproducing system of the apparatus.

A current magnetic recording and reproducing apparatus which records and reproduces an information signal on and from a magnetic tape such as a video tape recorder is loaded with a magnetic tape in a manner such that the magnetic tape is contained in a tape cassette for ease of handling as well as for protection of the magnetic tape. In order to load the magnetic tape contained in the tape cassette into the recording and reproducing system of the video tape recorder which includes a guide drum on which magnetic heads are carried, a cassette loading system is used for transporting the tape cassette from an eject position to a predetermined loading position defined relative to the position of the guide drum and for wrapping the tape around the guide drum in a predetermined manner. The loading system is used also for disengaging the magnetic tape from the guide drum and for transporting the tape cassette back to the initial eject position for removal of the tape cassette.

There are several types of tape cassettes which are currently sold in the market. On typical example of such a tape cassette is called a "standard size" tape cassette and is used widely in home video tape recorders. The aforementioned standard size tape cassette may have a typical dimension of 188×104×25 mm, for example, and accommodates a half inch wide magnetic tape wound around a supply reel and a take up reel with such an amount that a few hours of recording time is obtained. The specification for the tape cassette as well as for the recording format on the magnetic tape is standardized in relation to the type of video tape recorder so that the magnetic tape cassettes produced by different manufacturers can be used as long as the specification matches with the type of video tape recorder.

Recently, a more compact video tape recorder has been developed so as to realize a portable video tape recorder combined with a television camera and the like. Such a tape cassette has a reduced size so as to decrease the size and weight of the video tape recorder. In order to reduce the size, the compact size tape cassette contains a smaller amount of magnetic tape having a substantially reduced separation between a supply reel and a take up reel. On the other hand, the recording format of the video signal and the audio signal on the tape are made identical to the "standard size" tape cassette, so that the compatibility with the home video tape recorder currently in use is maintained.

Conventionally, such a compact size tape cassette is reproduced by the home video tape recorder by using an adapter having a size identical to the size of the standard size tape cassette into which the compact size tape cassette is accommodated, as the size and construction of the tape cassette do not match with the loading system of the video tape recorder designed for the standard size tape cassette. However, the use of this adapter is cumbersome and indeed inconvenient. Thus, there is a demand for a cassette loading system of a video tape recorder which can handle both the standard size tape cassette and compact size tape cassette.

United States Patent Application entitled "Tape Cassette Loading System" filed by Mihara et al., based on the Japanese Patent Applications No.253096/1987, No.305165/1987 and No.305164/1987 claiming a priority date of Oct. 7, 1987, discloses a loading system comprising a cassette tray on which a standard size tape cassette and a compact size tape cassette are placed. The cassette tray is carried by a carriage and is movable in a horizontal direction into and out of the body of the video tape recorder. Further, the cassette tray is carried by an elevating mechanism and is movable in a vertical direction. Thus, the standard size or compact size tape cassette placed on the cassette tray is transported to the inside of the video tape recorder horizontally and then transported vertically to the predetermined loading position.

In order to load the magnetic tape in the tape cassette on the guide drum of the video tape recorder, a tape loading mechanism is further needed which enters into the tape cassette and draws out the magnetic tape from the tape cassette in order to wrap the magnetic tape around the guide drum as well as for engaging a drive mechanism with the take up reel and supply reel of the tape cassette. As the aforementioned tape cassette loading system handles both the standard size tape cassette and the compact size tape cassette, such a loading system should be equally capable of handling the magnetic tape contained in the standard size tape cassette and in the compact size tape cassette. However, the size and shape of a cutout portion formed in the tape cassette for allowing entrance of the tape loading mechanism is different for the standard size tape cassette and the compact size tape cassette. This means that the tape loading mechanism must be displaced responsive to the type of the tape cassette to be loaded. It is desirable that the time needed for loading the standard size tape cassette and for loading the compact size tape cassette until the magnetic tape is loaded on the drum of the videotape recorder be equal so that the user of the video tape recorder can play the standard size tape cassette and the compact size tape cassette without noticing any difference in the operation of the video tape recorder.

SUMMARY OF THE INVENTION

Accordingly, it is a general object of the present invention to provide a novel and useful tape cassette loading system wherein the aforementioned problems are eliminated.

Another and more specific object of the present invention is to provide a tape cassette loading system of a magnetic recording and reproducing apparatus in which tape cassettes having different dimension can be played without substantial difference in the operation performed by the user on the magnetic recording and reproducing apparatus.

Another object of the present invention is to provide a tape cassette loading system of a magnetic recording and reproducing apparatus in which loading of tape cassettes having different dimension can be made substantially in an identical loading time.

Another object of the present invention is to provide a tape cassette loading system of a magnetic recording and reproducing apparatus comprising cassette loading means adapted to hold a standard size tape cassette and a compact size tape cassette, said cassette loading means further being movable between an unloading state ready for placement or removal of the tape cassette and a ready-for-loading state ready for drawing out a magnetic tape contained in the tape cassette so as to wrap the magnetic tape around a guide drum of the magnetic recording and reproducing apparatus, tape loading means for drawing out the magnetic tape from the tape cassette and wrapping the magnetic tape around the guide drum, said tape loading means being movable between a first state for drawing out the magnetic tape from the standard size tape cassette and a second state for drawing out the magnetic tape from the compact size tape cassette, and a reel drive means adapted for engaging with a supply reel and a take up reel of the tape cassette placed on the cassette loading means for driving the supply reel and the take up reel, said reel drive means being movable between a first state for engagement with the reels in the standard size tape cassette and a second state for engagement with the reels in the compact size tape cassette, wherein the tape cassette loading system further comprises a controller which detects the type of the tape cassette placed on the cassette loading means, the state of the cassette loading means, tape loading means and the reel drive means and controls the cassette loading means, tape loading means and the reel drive means such that the cassette loading means is moved to a first ready-for-loading position when the standard size tape cassette is placed on the cassette loading means and to a second ready-for-loading position when the compact size tape cassette is placed on the cassette loading means, the tape loading means being set to the first state when the standard size tape cassette is placed on the cassette loading means and to the second state when the compact size tape cassette is placed on the cassette loading means, the reel drive means being set to the first state when the standard size tape cassette is placed on the cassette loading means and to the second state when the compact size tape cassette is placed on the cassette loading means, and the switching of the state of the cassette loading means, tape loading means and the reel drive means being started simultaneously responsive to the start of the loading operation when the tape cassette placed on the cassette loading means is changed from one type to the other. According to the present invention, switching of the state of the tape loading means and the reel drive means responsive to the change in the type of tape cassette is started simultaneously with the movement of the cassette loading means and the time required for switching the state of the loading system responsive to the change of the tape cassette is minimized. Thus, there is no substantial difference in time when a standard size tape cassette is loaded and when a compact size tape cassette is loaded. As a result, the user can load the standard size tape cassette and the compact size tape cassette without noticing substantial difference in the loading operation of the tape cassette loading system. Further, the user can simply place the standard size tape cassette or the compact size tape cassette on the cassette loading means when playing the magnetic recording and reproducing apparatus and the complicated switching operation by the user is not necessary. Thus, the user can play both the standard size tape cassette and the compact size tape cassette without noticing any substantial difference.

Still other objects and further features of the present invention will become apparent from the following detailed description on the preferred embodiments of the present invention when read in conjunction with the annexed drawing.

BRIEF DESCRIPTION OF THE DRAWINGS

FIGS. 4(A) and (B) are side views respectively showing mechanisms for moving a cassette tray which holds the standard size tape cassette or compact size tape cassette in a horizontal direction and in a vertical direction;

FIGS.5(A)–(D) are diagrams showing a detector used for detection of the position of the cassette tray in FIG.1;

FIGS.7(A)–(C) are a plan view and two side views showing a sub-chassis which carries a reel drive mechanism;

FIGS.8(A)–(D) are diagrams showing an up/down mechanism for raising and lowering the sub-chassis in FIG.7(A)–(C);

FIGS.21(A)-(C) are diagrams showing the various states of the tape cassette loading system of the present invention;

FIGS.23(A)-(C) are diagrams similar to FIGS.21(A)-(C) showing the various states of the tape cassette loading system of the present invention.

DETAILED DESCRIPTION

Figure 1A:
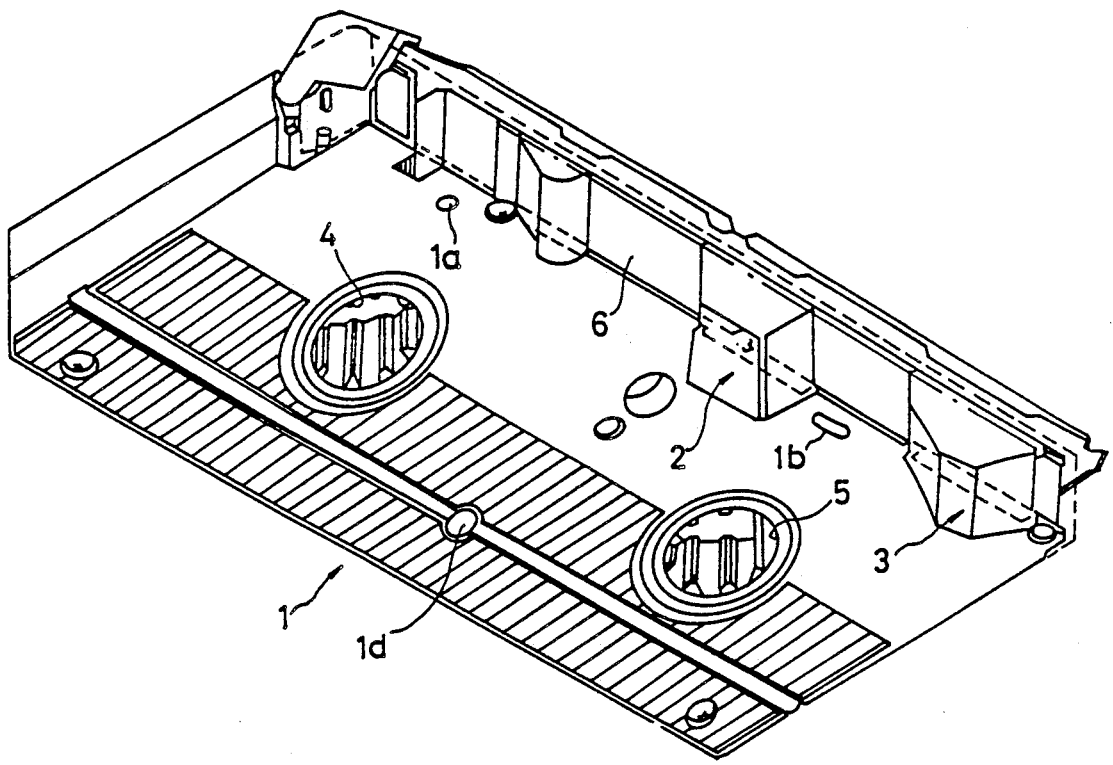
FIGS.1(A) and (B) are perspective views respectively showing a standard size tape cassette and a compact size tape cassette used in the tape cassette loading system of the present invention.

FIG.1 shows a standard size tape cassette 1 used in the tape loading system of the present invention in a state that a front lid of the tape cassette for protection of a magnetic tape contained therein is slightly opened. The tape cassette may have a typical dimension of 188×104×25 mm. The magnetic tape (not shown) is wound on a take up reel 4 and a supply reel 5 and extends along a front wall 6 of the tape cassette 1. On the front wall 6 of the tape cassette 1 there is further provided various cutouts such as a cutout 2 and a cutout 3 for accepting a tape loading mechanism to be described in detail later which draws out the magnetic tape from the tape cassette 1 and wraps the magnetic tape around a guide drum (not shown) carrying a plurality of magnetic heads thereon.

Figure 1B:
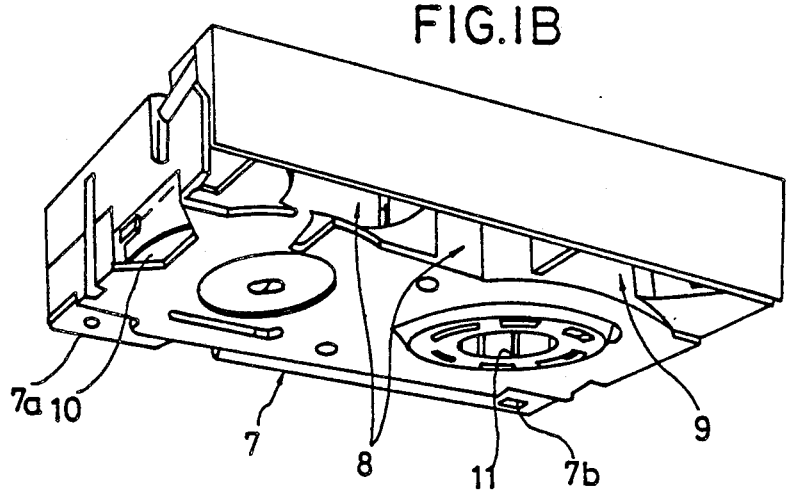

FIG.1(B) shows a compact size tape cassette 7 having a size substantially smaller than the size of the standard size tape cassette. The tape cassette 7 has a take up reel 10 and a supply reel 11 on which the magnetic tape is wound. As a consequence of the reduced size of the tape cassette, the distance between the take up reel and the supply reel is smaller as compared to the distance between the take up reel 4 and the supply reel 5 of the standard size tape cassette 1. The tape cassette 7 further has a cutout 8 and a cutout 9 for accepting the tape loading mechanism similar to the case of the standard size tape cassette. As a result of the difference in the size of the tape cassette, the cutouts 8 and 9 are also different in size and shape as compared to the cutouts 2 and 3 in the standard size tape cassette. Further, the take up reel 11 is driven by meshing a drive gear of a reel drive mechanism to a tooth formed around the periphery of the take up reel 10 in the compact size tape cassette whereas in the standard size tape cassette a drive shaft of the reel drive mechanism is directly inserted to a bore formed in the take up reel 4.

Thus, the tape cassette loading system which can handle both the standard size tape cassette and the compact size tape cassette should be able to adapt to the difference in the size and shape of the cutouts, difference in the distance between the take up reel and the supply reel and the difference in the driving mechanism of the take up reel by shifting the position or state of the tape loading mechanism, the reel drive mechanism and the like.

In a magnetic recording and reproducing apparatus such as a video tape recorder which is capable of playing both the standard size tape cassette and the compact size tape cassette, it is desirable that the tape cassette loading system used in the video tape recorder for loading the tape cassette be usually set to a primary state for loading the standard size tape cassette and that the tape cassette loading system be set to a secondary state for loading the compact size tape cassette only when the compact size tape cassette is to be played so that the user does have to wait for a long time until the loading of the frequently used standard size tape cassette is completed. However, in such a video tape recorder, the user has to wait for a long period of time until the loading of the compact size tape cassette is completed.

Next, the tape cassette loading system of the present invention which solves the aforementioned problems will be described with reference to the attached drawings. The tape cassette loading system of the present invention uses a cassette loading mechanism comprising a cassette tray which is a generally rectangular tray adapted for accepting a standard size tape cassette and further having a depression adapted for accepting a compact size tape cassette, a carriage for carrying the cassette tray in a horizontal direction between a first state in which the cassette tray is located substantially outside the video tape recorder so that the user can easily place and remove the standard size tape cassette or compact size tape cassette on and from the cassette tray and a second state in which the cassette tray is located inside the video tape recorder substantially above a ready-for-loading position in which the magnetic tape in the tape cassette is in a position ready for being drawn out so that the magnetic tape is wrapped around the guide drum, and a cassette tray drive mechanism for moving the carriage in a horizontal direction and for moving the cassette tray in a vertical direction between said second state, a first ready-for-loading position for the compact size tape cassette, and a second ready-for-loading position for the standard size tape cassette. Detailed disclosure for the aforementioned part of the tape loading system will be found in the aforementioned United States Patent Application by Mihara et al.

Figure 2B:
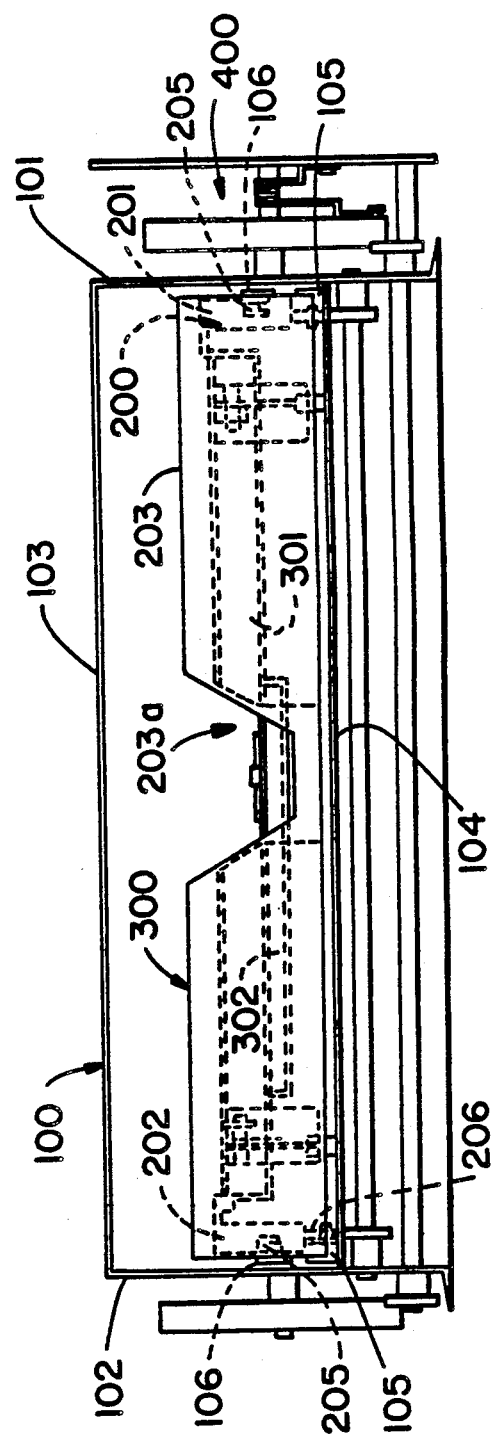
FIGS.2(A) and (B) are respectively a plan view and a front view showing an embodiment of the tape cassette loading system of the present invention, FIGS.3(A)–(D); are side views showing various states of the tape cassette loading system of FIGS.2(A) and (B)

Referring to FIGS.2(A) and (B), the cassette loading mechanism of the present invention comprises a housing 100, a carriage 200, a cassette tray 300 and a cassette tray drive mechanism 400. The housing 100 comprises a pair of side walls 101 and 102, a top wall 103 and a bottom wall 104 as clearly seen in FIG.2(B). The side walls 101 and 102 are provided with a pair of vertical guide grooves 107a and 107b to be described later, and carry a pair of opposing rollers 105 and another pair of opposing rollers 106 at the respective internal surfaces (see FIG.3(A) and (B)). The carriage 200 comprises a pair of side frames 201 and 202, and a pair of front and rear frames 203 and 204. The side frames 201 and 202 are supported on the guide rollers 105 and are movable horizontally in a front direction and a rear direction. In the present specification, the rear direction is defined as the direction indicating the inside of a body 20 of the video tape recorder and the front direction is defined as the direction indicating the outside of the body 20 of the video tape recorder as shown in FIG.2(A). Further, each of the side frames 201 and 202 is provided with a guide groove 205 extending along the frame, and the aforementioned guide rollers 106 engage with the guide grooves 205 as can be seen in FIG.2(B). Thus, the carriage 200 is movable horizontally in the front and rear directions stably guided by the guide rollers 105 and 106. At the bottom of the side frame 201 and 202 to which the guide rollers 105 are engaged, a tooth portion 206 is formed as can be seen in FIGS.3(A) and (B). This tooth 206 is engaged with a gear of a cassette tray drive mechanism 400 including a motor 401 shown in FIG.-2(A) as will be described later with reference to FIGS.-4(A) and (B), and the carriage 200 is moved horizontally in the front and rear directions responsive to energization of the motor 401.

The cassette tray 300 is a generally rectangular tray as can be seen in FIG.2(A) and comprises a main part 301 for supporting the standard size tape cassette 1 placed thereon and a generally rectangular depression 302 for supporting the compact size tape cassette 7. As can be seen in the drawing, the depression 302 is formed on a part of the main part 301. Further, the main part 301 and the depression 302 are formed with a cutout 303 for allowing entrance of a tape loading member to be described later with reference to FIG.10 and a pair of openings 304 and 305 for allowing insertion of a reel drive mechanism to be described later with reference to FIGS.7(A)-(C) for driving of the take up reel and the supply reel. The cassette tray 300 further has a pair of pins 306 close to the center of its right side edge and its left side edge. These pins 306 engage with a U-shaped groove 404 (FIG. 3(C)) of an elevating member 403 which moves vertically responsive to the mechanism 400. Further, the cassette tray 300 carries switches 307 for detecting the placement of the standard size tape cassette on the main part 301 and switches 308 for detecting the placement of the compact size tape cassette on the depression 302. The switches 307 and 308 may each be a type of switch which is closed by the weight of the tape cassette placed on the cassette tray. In other words, the switch 307 is closed when the standard size tape cassette is placed on the main part 301 of the cassette tray 300 and the switch 308 is closed when the compact size tape cassette is placed on the depression 302 of the cassette tray 300.

FIG.2(B) further shows a conspicuous cutout 203a provided on the rear frame 203 of the carriage 200. This cutout is for facilitating the removal of the standard size tape cassette Placed on the cassette tray 300. A corresponding cutout is formed also on the rear wall of the cassette tray 300.

Figure 3B:
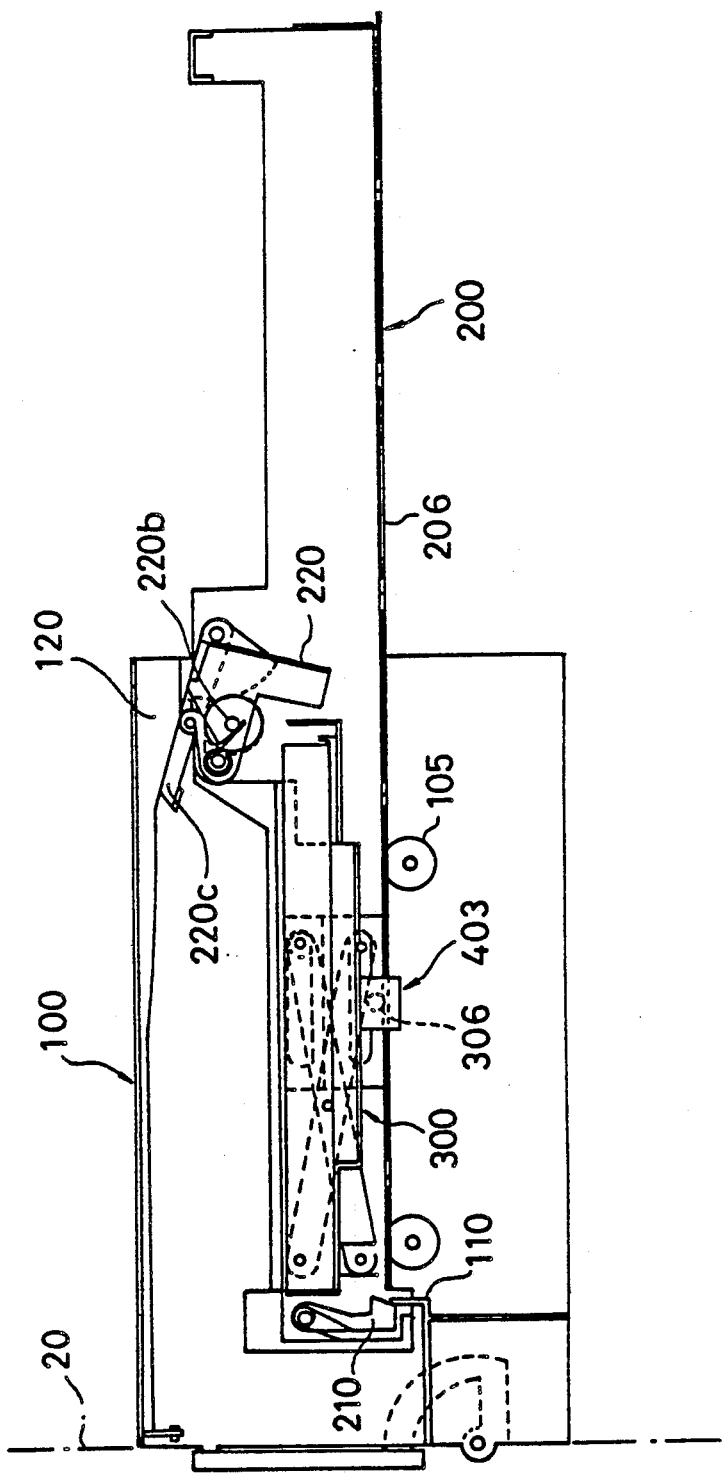

FIG.3(A) shows a state in which the carriage 200 in fully moved to the front direction and the cassette tray 300 is located outside the body 20 of the video tape recorder. This state is called an unloading position and will be designated as an EJECT state. In this state, the placement or removal of the tape cassette on and from the cassette tray 300 can be made by the user without difficulty. FIG.3(B) on the other hand shows a state in which the carriage 200 is fully moved to the rear direction into the body 20 of the video tape recorder. In the following description, this state will be referred to as a CLOSED state. FIG.3(C) shows another state in which the cassette tray 300 is lowered by the mechanism 400 to a state in which the compact size tape cassette on the cassette tray 300 assumes a position ready for loading the magnetic tape on a drum (not shown) of the video tape recorder. This state will be referred to as a C state. FIG.3(D) on the other hand shows a state in which the cassette tray 300 is fully lowered by the mechanism 400. In this state, the standard size tape cassette held on the cassette tray 300 assumes a position ready for loading the magnetic tape of the tape cassette on the guide drum of the video tape recorder. The difference in the level of the cassette tray 300 between the C state and a standard state shown in FIG.3(D) arises due to the difference in the size of the tape cassette. Thus, this standard state will be called an STD state.

FIGS.3(A)-(D) further show a mechanism for releasably holding the cassette tray 300 on the carriage 200. The mechanism comprises a catch 210 rotatably provided on the carriage 200 around a pin 210b and a closing member 220 rotatably held on the carriage 200 around a pin 220b. The catch 210 is urged in a counterclockwise direction in FIG.3(A) by a spring 210a and holds a front end of the depression 302 formed in the cassette tray 300. Further, the closing member 220 is urged by a spring 220a in a clockwise direction and holds the cassette tray 300. In the EJECT state shown in FIG.3(A), the closing member 220 closes the cutout 303 formed at the rear end of the cassette tray 300. Thus, the closing member 220 not only holds the cassette tray 300 on the carriage 200 but also protects the video tape recorder from penetration of dust through the cutout 303 when the cassette tray 300 is fully moved in the front direction. When the carriage 200 is moved in the rear direction to the CLOSED state shown in FIG.3(B), the catch 210 is engaged with a stopper 110 formed on the housing 100 and is rotated in the clockwise direction. Thus, the catch 210 is released from the cassette tray 300. Further, a lever portion 220b formed on the closing member 220 is engaged with a slope 120 formed on the housing 100 and the closing member 220 is rotated in the counterclockwise direction as shown in FIG.3(B). In this state, the closing member 220 is released from the cassette tray 300. In other words, the cassette tray 300 is disengaged from the carriage 200 in the CLOSED state and is held in the elevating member 403 of the mechanism 400.

Next, the drive mechanism 400 will be described with reference to FIGS.4(A) and (B). The drive mechanism 400 comprises the motor 401 and a gear train 402 comprising a main gear 402a, a cam gear 402b and a carriage drive gear 402c. The main gear 402a is rotated responsive to the rotation of the motor 401 and responsive to the rotation of the main gear 402a, the cam gear 402b and the carriage drive gear 402 are rotated. The carriage drive gear 402 is meshed with the tooth 206 formed on the side frame 201, 202 of the carriage 200 and the carriage 200 is moved horizontally in the front direction or in the rear direction responsive to the energization of the motor 401. Further, the mechanism 400 comprises a swing arm 406 which is rotatably fixed on the side wall 101 of the housing 100 by a pin 407. The cam gear 402b carries on its inner side a generally spiral-shaped cam groove 415 (FIGS.5(A)-(D)) and a pin 408 formed on an intermediate position on the arm 406 is engaged with the cam groove 415. As can be seen from FIGS.5(A)-(D), the cam groove 415 comprises a concentric part 415a positioned at a constant distance from the center of the cam disk 402b and a spiral part 415b which increases in distance from the center of the cam gear 402b with the rotation of the cam gear 402b. Thus, the arm 406 does not move as long as the pin 408 is engaged with the concentric part 415a of the groove 415 while the arm 406 is swung upwards or downwards responsive to the rotation of the cam gear 402b when the pin 408 is engaged with the spiral part 415b of the groove 415. The arm 406 has on its tip end far from the end where it is held on the side wall 101 by the pin 407 an elongated hole 409, and a pin 410 which is connected to the aforementioned elevating member 403 is engaged with the hole 409. The pin 410 is guided in a vertical guide groove 107 formed on the side wall 101 of the housing 100 and is moved vertically responsive to the swinging portion of the arm 406. The elevating member 403 is formed with a U-shaped groove 404 and the pin 306 of the cassette tray 300 is engaged in the groove 404. Thus, the cassette tray 300 is moved vertically up or down responsive to the energization of the motor when the pin 408 is engaged with the spiral part 415$b$ of the cam groove 415 on the cam gear 402$b$.

Further, it should be noted that the main gear 402$a$ which drives the gear 402$c$ for movement of the carriage 200 has its tooth 402$_{a-1}$ (FIGS.5(A)-(C)) for a limited arc length. Thus, the continuous driving of the carriage 200 after the carriage is moved completely to the CLOSED state in FIG.3(B) is avoided.

FIG.4(B) further shows a link mechanism 412 for maintaining the cassette tray horizontally during ascent or descent of the cassette tray 300. The link mechanism 412 comprises a pair of link arms 412$a$ and 412$b$ which cross one another at a center of each of the link arms so as to form an X-shaped configuration. A pin 412$c$ is inserted through the center of each of the link arms so as to rotatably hold the pair of the link arms. An end of the link arm 412$a$ is connected to the cassette tray 300 by a pin 300$b$ and the other end of the link arm carries a roller 412$e$ which slidably engages with a groove 201$a$ formed on the side frame 201 of the carriage 200. Further an end of the link arm 412$b$ is connected to the side frame 201 by a pin 201$b$ and the other end of the link arm 412$b$ carries roller 412$d$ which slidably engages with a groove 300$a$ formed in the cassette tray 300. Thus, the cassette tray 300 is held horizontally as it is moved in the vertical direction by the arm 406 as illustrated in FIGS.3(A)-(D).

As the horizontal and vertical movement of the cassette tray 300 is determined by the rotation of the motor 401 and the gear train 402 driven by the motor 401, the state of the tape cassette held on the cassette tray 300 as illustrated in FIGS.3(A)-(D) can be detected by sensing the angle of rotation of the gear in the gear train 402. For this purpose, a first detector 405 shown schematically in FIG.2(A) is used. The detector 405 comprises three optical sensors as more clearly seen in FIG.4(A) and in FIG.5(A) and which are designated as SW1, SW2 and SW3 respectively. The sensors SW1-SW3 are disposed so as to detect the change in the reflection of light at the outer surface of the main gear 402$a$ and the main gear 402$a$ carries on its outer surface a plurality of concentric reflection patterns 416$a$–416$c$ (FIGS.5(A)-(C)) as an indication of the state of the cassette tray 300.

Figure 6:
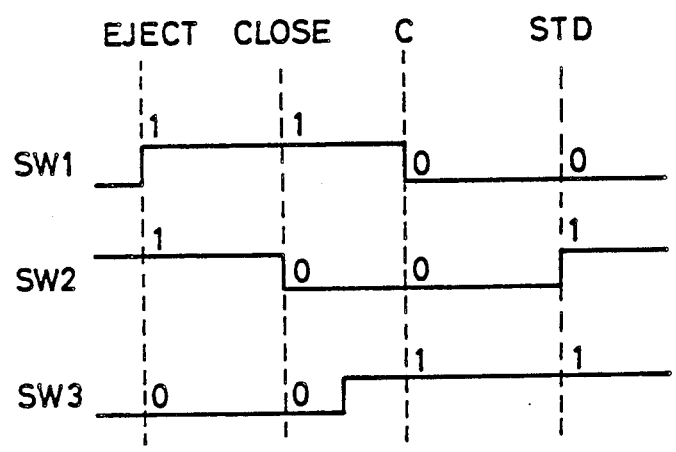
FIG.6 is a diagram showing an output signal of the detector in FIGS.5(A)–(C)

FIGS.5(A)-(D) show the reflection pattern on the main gear 402$a$. Referring to the drawing, the sensors SW1-SW3 are aligned vertically on a line extending in the downward direction from the center of the main gear 402$a$ and the reflection patterns 416$a$–416$c$ are illustrated as black stripes. As can be seen in the drawing, he reflection patterns 416$a$–416$c$ are a plurality of concentric patterns extending for different arc lengths and the reflection of the pattern 416$a$ is detected by the sensor SW1, the reflection of the pattern 416$b$ is detected by the sensor SW2 and the reflection of the pattern 416$c$ is detected by the sensor SW3. Responsive to the rotation of the main gear 402$a$, the reflection of light detected by the optical sensors SW1-SW3 changes as shown in FIG.6 which shows output signals of the sensors SW1-SW3.

FIG.5(A) represents the EJECT state as defined in FIG.3(A) in which the cassette tray 300 is fully moved to the front direction. In this state, the arm 406 is swing to a raised position and the pin 408 of the arm is engaged with the concentric part 415$a$ of the cam groove 415. Further the sensors SW1 and SW2 oppose to the reflectors 416$a$ and the 416$b$. On the other hand, the sensor SW3 does not oppose the reflector 416$c$. Thus the output signal from the sensor SW1 assumes a high level state, the output signal from the sensor SW2 assumes a high level state, and the output signal from the sensor SW3 assumes a low level state. As a result, the output signal of the detector 405 is represented by (110). Responsive to the rotation of the motor 401, the main gear 402$a$ is rotated as indicated in the arrow in FIG.5(A) and the carriage 200 is fully moved in the rear direction as a result of rotation of the gear 402$c$. Thus, FIG.5(B) represents the CLOSED state as defined in FIG.3(B). In FIG.5(B), the pin 408 of the arm 406 is still engaged with the concentric part 415$a$ of the cam groove 415 and the state of the arm 406 is not changed. In other words, the cassette tray is still at the same level as the level in the EJECT state. However, the reflection patterns 416$a$–416$c$ together with the rotation of the main gear 402$a$ and the sensor SW1 alone detects the reflection. Thus, the output signal of the sensor SW1 is high, the output signal of the sensor SW2 is low, and the output signal of the sensor SW3 is low as shown in FIG.6. In other words, the output signal of the detector 405 is represented by (100) in the CLOSED state. Responsive to the further rotation of the motor 401, the main gear 402 is rotated further. However, as the main gear has the tooth 402$_{a-1}$ *for engagement with the gear* 402$c$ for a limited arc length or angular distance, the gear 402$c$ for driving the carriage 200 is not rotated further. On the other hand, the pin 408 on the arm 406 is engaged with the spiral part 415$b$ of the cam groove 415 and the arm 406 is swung in the downward direction with the rotation of the main gear 402$a$ as shown in FIG.5(C). Thus, the cassette tray 300 reaches the C state as defined in FIG.3(C) for the loading of the compact size tape cassette. Responsive to the rotation of the main gear 402$a$, the position of the reflection patterns is also changed. Thus the sensors SW1 and SW2 produce low level output signals while the sensor SW3 produces a high level output signal as shown in FIG.6. In other words, the detector 405 produces an output signal (001) when the cassette tray 300 is in the C state. Responsive to the further rotation of the main gear 402$a$, the arm 408 is further lowered and the state shown in FIG.5(D) is reached. In this state, the cassette tray 300 is fully lowered. Thus, FIG.5(D) shows the STD state as defined in FIG.3(D). Responsive to the rotation of the main gear 402$a$, the reflection patterns 416$a$–416$c$ are also rotated and the sensors SW1, SW2 and SW3 produce output signals as indicated by STD in FIG.6. In other words, the detector 405 produces an output signal (011) when the cassette tray 300 is in the STD state.

Next, a!reel drive mechanism used in the tape cassette loading system for driving the take up reel and supply reel of the tape cassette will be described. As the level of the cassette tray 300 differs between the C state and the STD state, it is necessary to change the level of the reel drive mechanism responsive to the level of the cassette tray such that the reel drive mechanism assumes an UP state when the cassette tray is in the C state and a DOWN state when the cassette tray is in the STD state.

Referring to FIG.7(A), the reel drive mechanism comprises a main chassis 500 fixed to the housing 100 of the tape cassette loading system. The main chassis carries positioning pins 501$a$ and 501$b$ for positioning the standard size tape cassette in the STD state, level reference pins 502a and 502b for determining the level of the standard size tape cassette in the STD state, a pin 503 for releasing the brake of the reels in the standard size tape cassette in the STD state, and a supply reel disk 504 and a take up reel disk 505 for driving the supply reel and the take up reel of the standard tape cassette held in the STD state by the cassette tray 300. In the STD state, the pins 501a and 501b enter the cut-out 303 of the cassette tray 300 and engage with positioning depressions 1a and 1b formed on the bottom of the standard size tape cassette 1 on the cassette tray 300 (FIG.1(A)), the pins 502a and 502b penetrate the cassette tray 300 through corresponding holes 310a and 310b (FIG.2(A)) and support the bottom of the standard size tape cassette at a predetermined level, and the pin 503 penetrates the cassette tray 300 through a corresponding hole 310c and engages with a hole 1d (FIG.1(A)) for accepting a pin for releasing the brake of the reels. Further, the reel disks 504 and 505 are accepted in the openings 304 and 305 of the cassette tray 300 when the cassette tray 300 is lowered from the CLOSED state to the STD state. Thus, the main chassis 500 is disposed on the housing 100 at a position immediately below the cassette tray 300 when the cassette tray 300 is in the CLOSED state from which the cassette tray is vertically lowered to the C state and to the S state.

Referring to FIG.7(A) again, the reel drive mechanism further comprises a sub-chassis 600 provided below the main chassis 500 in a manner movable up and down relative to the main chassis 500. The sub-chassis 600 carries positioning pins 601a and 601b for positioning the compact size tape cassette in the C state, and level reference pins 602a and 602b for determining the level of the compact size tape cassette in the C state. In the C state, the sub-chassis is moved to the UP state and the pins 601a and 601b penetrate through corresponding holes 311a and 311b (FIG.2(A)) in the cassette tray 300 and engage with depressions 7a and 7b (FIG.1(B)) formed on the bottom of the compact size tape cassette 7 on the cassette tray 300. Further, the sub-chassis 600 carries a drive gear 603 having a toothed lower flange 603a which engages with a toothed part of the take up reel disk 505 on the main chassis 500 when the sub-chassis 600 is in the UP state and further having a toothed upper flange 603b for engagement with the toothed take up reel 10 of the compact size tape cassette 7 when the sub-chassis 600 is in the UP state. In order to allow the engagement of the pins 601a, 601b, 602a and 602b and the gear 603 on the sub-chassis 600, which in turn is located below the main chassis 500, with the compact size tape cassette 7, the main chassis 500 is further provided with cutouts 506a and 506b as shown in FIG.7(A).

Next, the mechanism for moving the sub-chassis 600 up and down will be described. Referring to FIGS.7(B) and (C), the sub-chassis 600 is carried at an end of a pair of generally L-shaped arms 604 which are swung up and down around their respective central parts by a rotary shaft 606. As will be described in detail with reference to FIG.8(B), the rotary shaft 606 is driven by a drive mechanism mounted on the main chassis 500. As can be seen in FIG.7(B), a pair of such L-shaped arms 604 are used with the other end of the arms 604 being connected by a connecting rod 605 so that the arms 604 are moved uniformly with respect to one another and the sub-chassis 600 is held horizontal during the up/down movement between the UP state and the DOWN state. In FIG.7(B), the arm 604 is in its raised state and the sub-chassis 600 is in the UP state for supporting and driving the compact size tape cassette 7. In other words, the UP state in FIG.7(B) corresponds to the C state in FIG.3(C). In FIG.7(C), on the other hand, the arm 604 is in its lowered state and the sub-chassis 600 is in the DOWN state for supporting and driving the standard size tape cassette 1. Thus, the DOWN state in FIG.7(C) corresponds to the STD state in FIG.3(D).

Figure 8A:
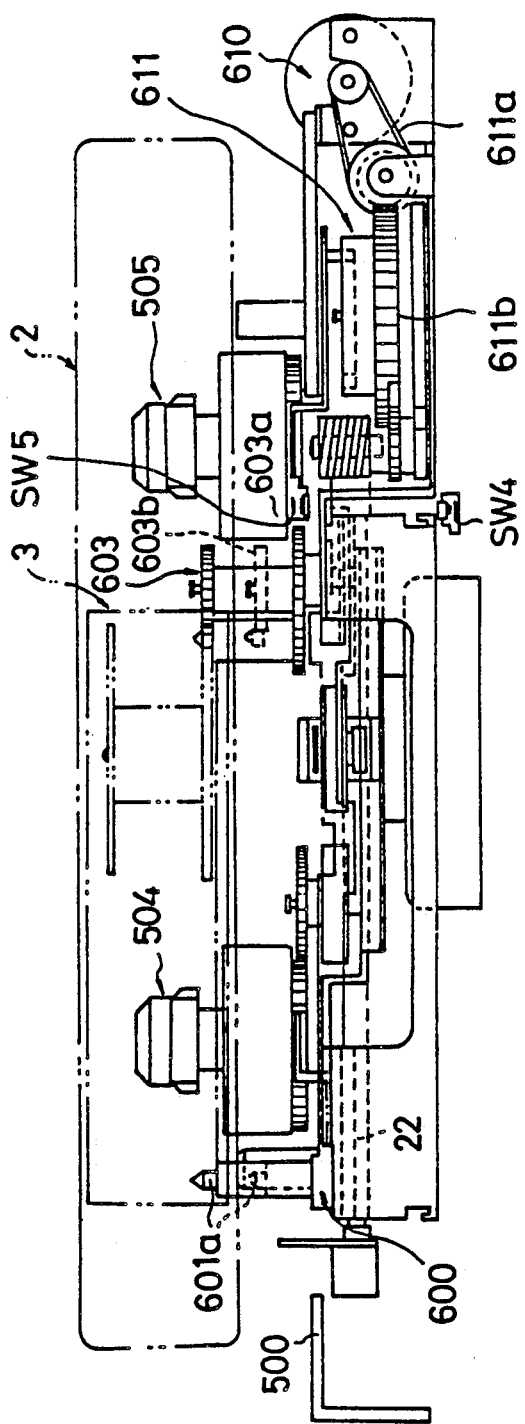

FIGS.8(A) and (B) show the details of the drive mechanism used for driving the rotary shaft 606 so as to move the sub-chassis 600 up and down. The mechanism comprises a drive motor 610 and a gear train 611 driven by the motor 610. The gear train 611 comprises a belt and pulley mechanism 611a and a gear system 611b driven by the mechanism 611a, and drives a gear 612 (FIG.8(B)) provided at an end of the rotary shaft 606. Further, a pair of switches SW4 and SW5 are provided so as to detect the state of the sub-chassis 600. The switches SW4 and SW5 are more clearly illustrated in FIGS.8(C) and (D). The switch SW4 is fixed at a predetermined level relative to the main chassis 500 so that the switch SW4 is closed when the arm 604 is swung to the lowered state as shown in FIG.8(C) and so that the switch SW4 is opened when the arm 604 is swung to the raised state as shown in FIG.8(D). In other words, the switch SW4 is closed when the sub-chassis 600 is in the DOWN state. The switch SW5 on the other hand is fixed on the main chassis 500 and is closed when the arm 604 is swung to the raised state as shown in FIG.8(D) and is opened when the arm 604 is swung to the lowered state as shown in FIG.8(C). In other words, the switch SW5 is closed when the sub-chassis 600 is in the UP state.

Figure 9:
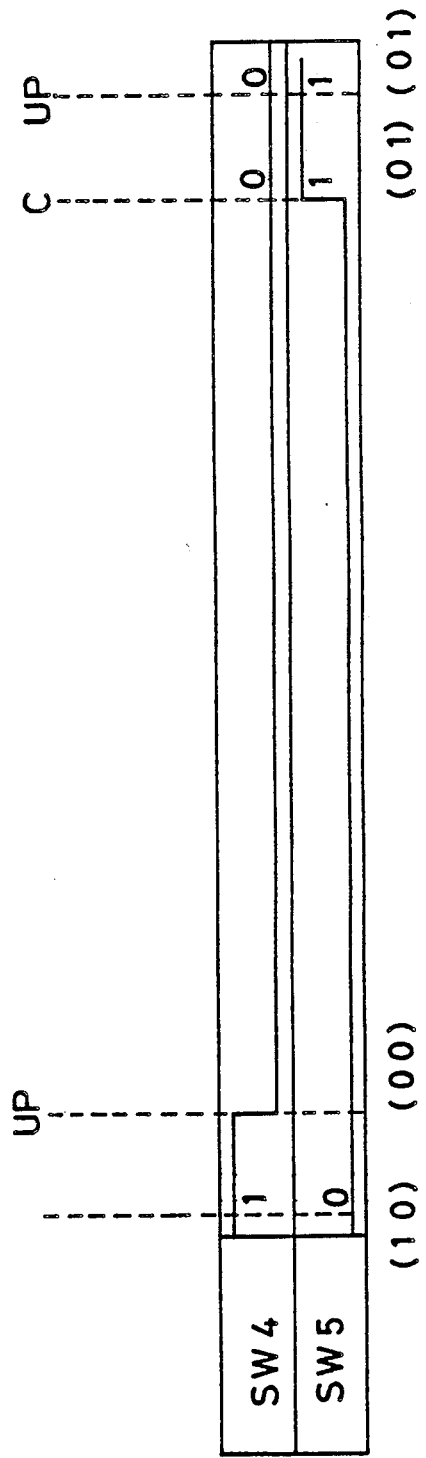
FIG.9 is a diagram showing an output signal of detector switches used in the up/down mechanism in FIGS.8(A)–(C)

FIG.9 shows the output signal of the switches SW4 and SW5. When the cassette tray 300 is in the STD state and the sub-chassis 600 is in the DOWN position, the switch SW4 is closed and the switch SW5 is opened. This state may be represented by the output signals of the switches SW4 and SW5 as (10) as shown in the drawing. When the motor 610 is energized and the sub-chassis 600 is raised, the switch SW4 is opened first and the state of the switches SW4 and SW5 are represented by the output signals as (00). As the motor 610 continues to be energized, the sub-chassis 600 is moved to the UP state where the switch SW4 is now closed. This state is represented as (01) as in the drawing. Thus, the state of the sub-chassis 600 is discriminated by the output signals of the switches SW4 and SW5. As described previously, the UP state of the sub-chassis 600 corresponds to the C state of the cassette tray 300 defined in FIG.3(C) and the DOWN state of the sub-chassis 600 corresponds to the STD state of the cassette tray 300 defined in FIG.3(D). In order that the sub-chassis 600 assumes its UP state when the cassette tray 300 is in the C state and its DOWN state when the cassette tray 300 is in the STD state, it is necessary to coordinate the operation of the motor 401 for the cassette tray 300 and the motor 610 for the subchassis 600. For this purpose, a controller to be described later is used. The states of the switches SW1-SW3 in FIG.6 and the states of the switches SW4 and SW5 are used in the controller for detection of the state of the cassette tray 300 and the sub-chassis 600 as will be described later.

Next, the tape loading mechanism used in the tape cassette loading system of the present invention will be described with reference to FIG.10. The tape loading mechanism comprises a main chassis 700 on which is carried a guide drum 800 which forms a part of the recording and reproducing system of the video tape recorder, and the guide drum 800 carries in turn a plurality of magnetic heads (not shown). Further, the main chassis 700 is formed with a first guide groove 701a along the guide drum 800 at a left hand side and a second guide groove 701b at a right hand side of the guide drum 800. The guide groove 701a guides a first base member 704a provided with a guide roller 702a and an inclined pole 703a which are used for drawing out the magnetic tape from the tape cassette and for wrapping the magnetic tape around the guide drum 800. The guide groove 701b on the other hand guides a second base member 704b provided with a guide roller 702b and an inclined pole 703b for drawing out the magnetic tape from the tape cassette and for wrapping the magnetic tape around the guide drum 800. Furthermore, the main chassis 700 carries a swing arm 705 on which is provided a guide pole 705a for drawing out the magnetic tape from the compact size tape cassette 7 to a predetermined position for loading the magnetic tape, other arms 706 and 707 on which are provided poles 706a and 707a for drawing out the magnetic tape from the tape cassette to a half loading state in which the magnetic tape makes a tangential contact with the guide drum 800, and a still another arm 708 on which a tension pole 708a for providing a predetermined tension to the magnetic tape is provided.

Figure 10:
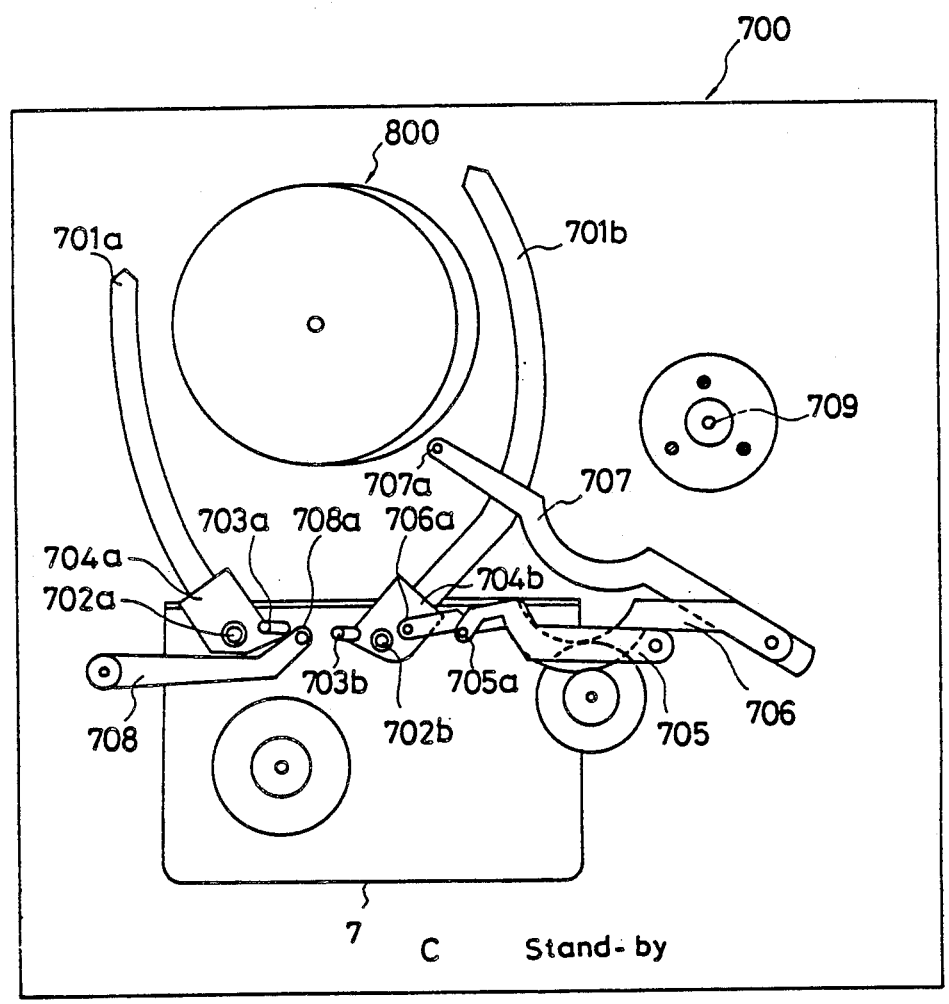
FIG.10 is a plan view showing a tape loading mechanism for drawing out a magnetic tape from the tape cassette and for wrapping the magnetic tape around a guide drum in a first ready for loading state for the standard size tape cassette.
Figure 11:
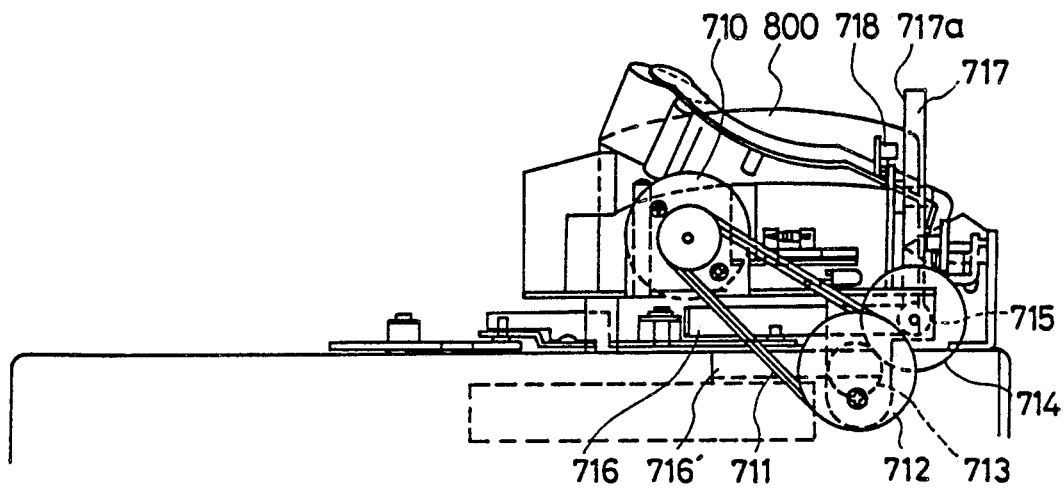
FIG.11 is a side view showing a drive mechanism for moving the tape loading mechanism of FIG.10.
Figure 12:
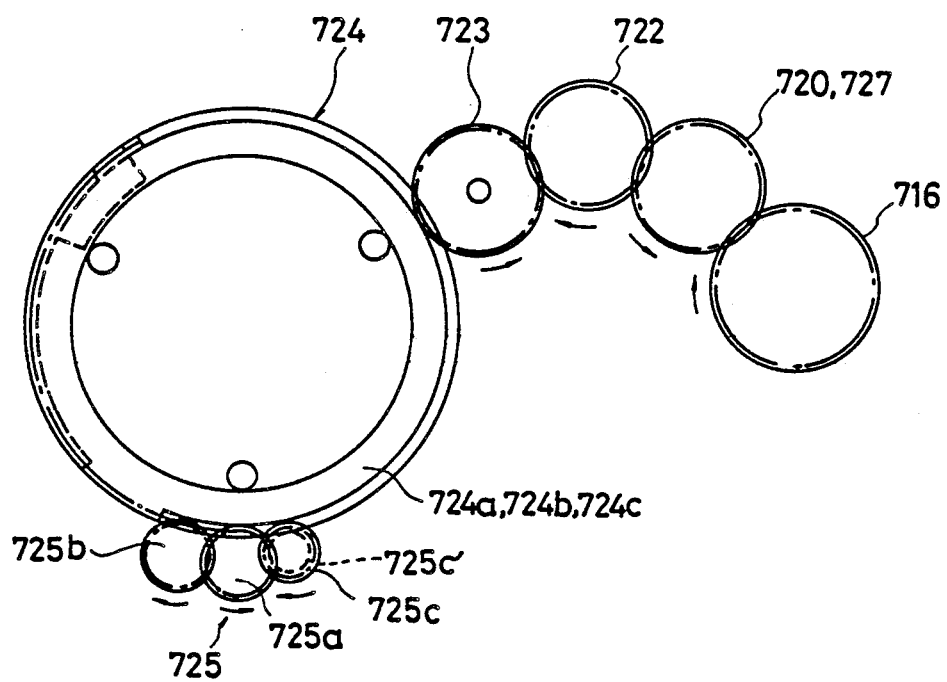
FIG.12 is a plan view showing a gear train used in the drive mechanism in FIG.11.

The arms carrying the various poles in FIG.10 are moved responsive to the type of the tape cassette placed on the cassette tray 300 by a drive mechanism as will be described with reference to FIGS.11–15. In the state shown in FIG.10, the base members 704a and 704b, and the arms 705–708 are in a state adapted for the compact size tape cassette. In other words, the poles on the base member and the poles on the arms are positioned so as to be accepted into the cutouts 8 and 9 on the compact size tape cassette 7 placed on the cassette tray 300 through the cutout 303 of the cassette tray. This state will be referred to as C STAND-BY. Referring to FIG.11, the drive mechanism comprises the motor 710, a belt 711 driven by the motor 710 for rotating a pulley 712, gears 713 and 714 driven by the pulley 712, and a worm gear 715 carried by the gear 714. The worm gear 715 drives on the one hand a main cam gear 716 and on the other hand a sub-cam gear 717 shown in FIG.11. The main cam gear 716 drives gears 716, 720, 721, 722 and 723 as shown in FIG.12, and the gear 723 drives a ring-shaped gear system 724. The ring-shaped gear system 724 comprises a first ring-shaped gear 724a, a second ring-shaped gear 724b, and a third ring-shaped gear 724c integral with the second ring-shaped gear 724c, and the gears 724a, 724b and 724c are stacked together on a same rotation axis. It should be noted that the gear 724a and the gears 724b, 724c are rotated in mutually opposite directions by a gear system 725. More specifically, the gear system 725 comprises a first gear 725a, a second gear 725b meshing with the first gear 725a and a third gear 725c also meshing with the first gear 725a. The first gear 725a is rotated responsive to the rotation of the gear 724a and the gear 724b which meshes with the second gear 725b is rotated in the opposite direction with a same speed as the gear 724a. It should be noted that the gear 724c which is integral with the gear 724b is also rotated unitarily with the gear 724b. When the gear 724b is rotated to a predetermined position to be described later, the meshing of the gear 725b with the ring gear 724b is released and the gear 725c starts to drive the gear 724c which is integral to the gear 724b with an increased speed of rotation. For this purpose, the gear 724b has a toothed portion extending for a limited angular range and the gear 724c has a toothed portion extending for another limited angular range. Further, the number of teeth on the gear 725b and on the gear 725c is different so that the gear 725c is rotated faster than the gear 725b.

FIG.13(A) shows a link mechanism connected to the ring gear system 724 for moving the base member 704a and 704b along the guide grooves 701a and 701b. The link mechanism comprises a link arm 726 connected at one end to the ring-shaped gear 724 by a pin 726a and the other end of the link arm 726 is connected to the base member 704a. Further, the link mechanism comprises a link arm 727 connected at one end to the ring-shaped gear 724 by a pin 727a and the other end of the link arm 727 is connected to the base member 704b. Thus, responsive to the rotation of the motor 710, the ring-shaped gear 724a and 724c are rotated in the opposite directions at a same speed, and thereafter the base member 704a and the base member 704b are moved along the grooves 701a and 701b at a same speed towards the guide drum 800. When the base member 704b reaches the half loading state corresponding to the aforementioned predetermined position of the ring-shaped gear 724c, the ring-shaped gear 724c starts to rotate with an increased speed and the base member 704 starts to move with a higher speed.

Figure 13B:
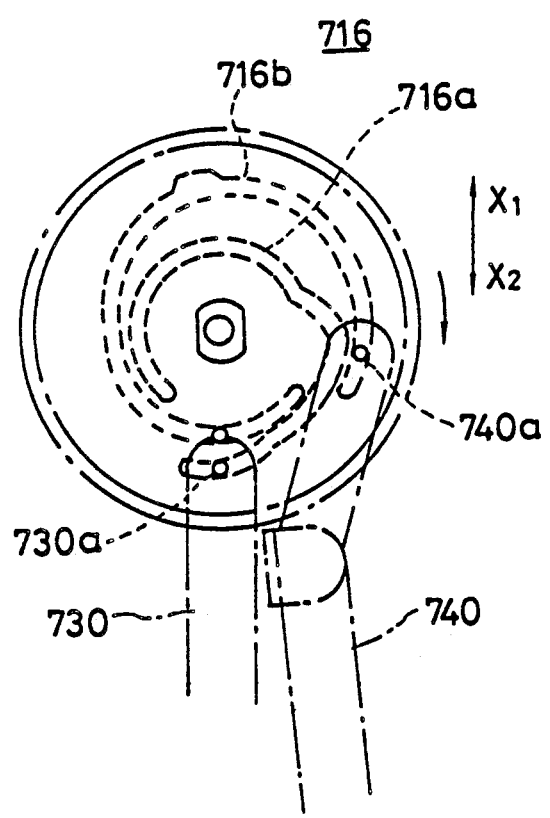
FIGS.13(A) and (B) are respectively a plan view showing an overall view of the tape loading mechanism together with the cooperating drive mechanism shown in FIGS.10–12 and a diagram showing the pattern of a cam groove formed on a cam gear shown in FIG.11.

FIG.13 (A) further shows a mechanism for moving the arms 705–708. Referring to the drawing, an end of a lever 730 is connected to the cam gear 716 by a pin 730a. The pin 730a is engaged with a cam groove to be described later with reference to FIG.13(B). Thus, the lever 730 is moved in a radial direction of the cam gear 716 responsive to the rotation of the cam gear. The other end of the lever 730 is connected to a fan-shaped lever 731 which is held rotatably on the main chassis 700 by a pin 731a, and the lever 731 is swung around the pin 731a responsive to the actuation by the lever 730. The lever 731 has a toothed part 731b at a fan-shaped end surface, and the toothed part 731b is engaged with a gear 732 held rotatably on the main chassis 700. Further, the gear 732 is meshed on the one hand with a gear 733 which is a gear formed at an end of the arm 705 and on the other hand with a gear 735a carrying a smaller gear 735b formed thereon as an integral part. The gear 735b in turn meshes with a gear 736 which drives a gear 737 formed at an end of the arm 706. Thus, responsive to the rotation of the cam gear 716, the lever 730 and the lever 731 are swung and the arms 705 and 706 are swung with respective speeds. Further, another lever 740 is engaged with a second cam groove on the cam gear 716 in a manner movable in the radial direction of the cam gear 716 as will be described, and the lever actuates a further lever 741 held rotatably on the main chassis 700 by a pin 741a responsive to the rotation of the cam gear 716. Responsive to the actuation by the lever 740, the lever 741 is swung clockwise or counter-clockwise on the chassis 700. The lever 741 has a toothed surface 741b at one end and a gear 742 held rotatably on the main chassis 700 is engaged with the toothed surface 741b of the lever 741. The gear 742 on the other hand is engaged with a toothed part 743 formed at an end of the arm 707. Thus, responsive to the rotation of the cam gear 716, the levers 740 and 741 are actuated, and responsive thereto, the arm 707 is swung.

FIG.13(B) shows the pattern of cam grooves 716a and 716b formed on the cam gear 716. The aforementioned pin 730a is engaged with the cam groove 716a and the aforementioned pin 740a is engaged with the cam groove 716b. The cam grooves 716a and 716b comprise a plurality of spiral groove portions and the levers 730 and 740 engaging with the grooves 716a and 716b are moved in the radial direction of the cam groove 716 as previously described with a speed which changes with the angle of rotation of the cam gear 716. Thus the arms 705–707 are moved with a speed which changes responsive to the rotation angle of the cam gear 716, and the drawing out of the magnetic tape from the tape cassette and wrapping of the magnetic tape around the guide drum is properly achieved.

Figure 14:
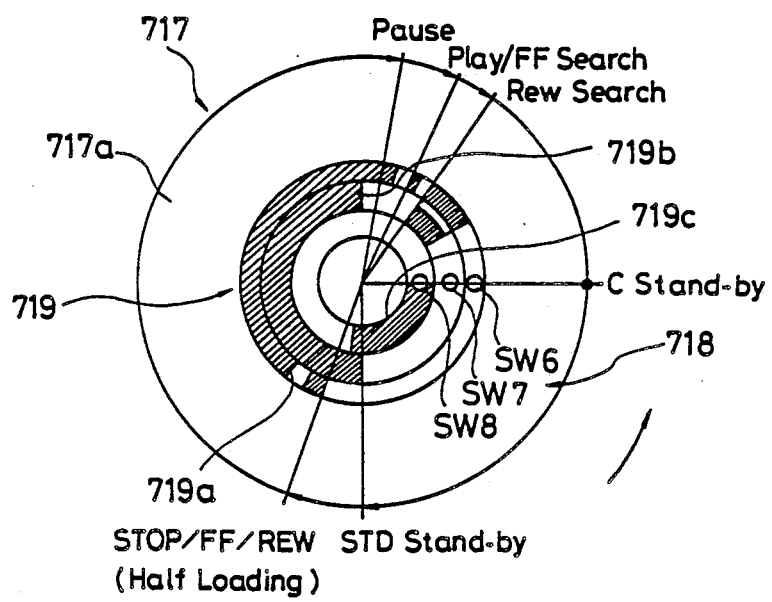
FIG.14 is a diagram showing a detector for detecting the state of the tape loading mechanism of FIG.13(A)

Thus, the state of the tape loading mechanism such as the base members 704a and 704b, and the arms 705–707 is determined uniquely by the rotation of the cam gear 716. In other words, the state of the tape loading mechanism is indicated by the rotation angle of the cam gear 716. As already described, the cam gear 716 is driven by the worm gear 715 which also drives the sub-cam gear 717. The sub-cam gear 717 has a same diameter and a same toothing as the main cam gear 716, and therefore, the rotation angle of the sub-cam gear 717 also represents the state of the loading mechanism. In the present embodiment, the sub-cam gear 717 carries on its surface 717a facing in the front direction a plurality of concentric reflection patterns 719a, 719b and 719c as illustrated in FIG.14. In order to detect the reflection patterns, a detector 718 comprising a plurality of optical sensors SW6, SW7 and SW8 aligned horizontally as shown in FIG.13(A) and in FIG.14 are provided so as to face the patterns 719a, 719b and 719c, respectively.

Figure 15:
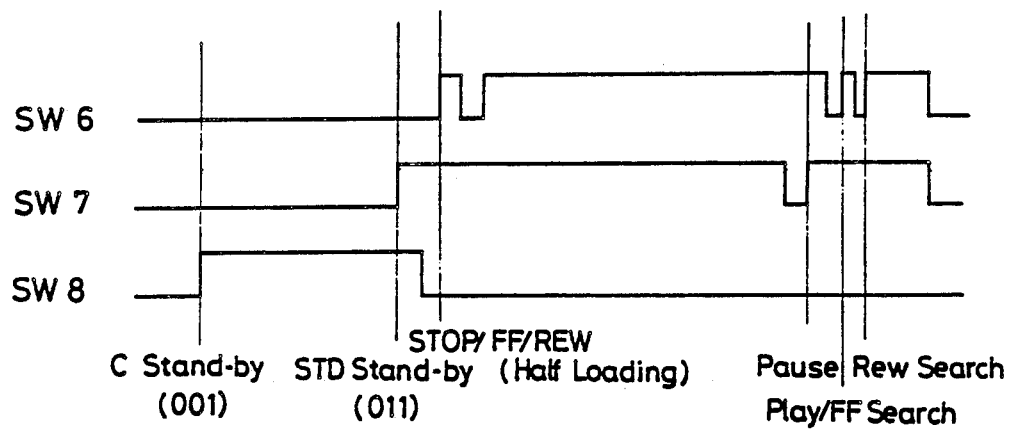
FIG.15 is a diagram showing an output signal from the detector of FIG.14.

Responsive to the rotation of the sub-cam gear 717, the reflection of light detected by the sensors SW6–SW8 is changed as illustrated in FIG.15. Thus, in the C STAND-BY state shown in FIG.10 where the tape loading mechanism is in the state ready for loading of the magnetic tape in the compact size tape cassette, the sensors SW6, SW7 and SW8 detect the reflection from the portion of the reflection pattern indicated by C STAND-BY in FIG.14. In this state, the sensors SW6 and SW7 detecting reflection from the pattern 719a and pattern 719b produce a low level output while the sensor SW8 produces a high level output. Thus, in the state shown in FIG.10, the state of the detector 718 may be represented by (001). Responsive to a further rotation of the sub-cam gear 717 in the counterclockwise direction from the C STAND-BY state in FIG.10, the tape loading mechanism assumes a second state in which the portion of the reflection patterns indicated by STD STAND-BY coincides with the horizontally aligned sensors SW6, SW7 and SW8. In this state, the sensor SW6 which faces the reflection pattern 719a produces a low level output while the sensors SW7 and SW8 which face the reflection pattern 719b produce a high level output as shown in FIG.15. Thus, in the STD STAND-BY state, the state of the detector 718 may be represented by (011).

Figure 16:
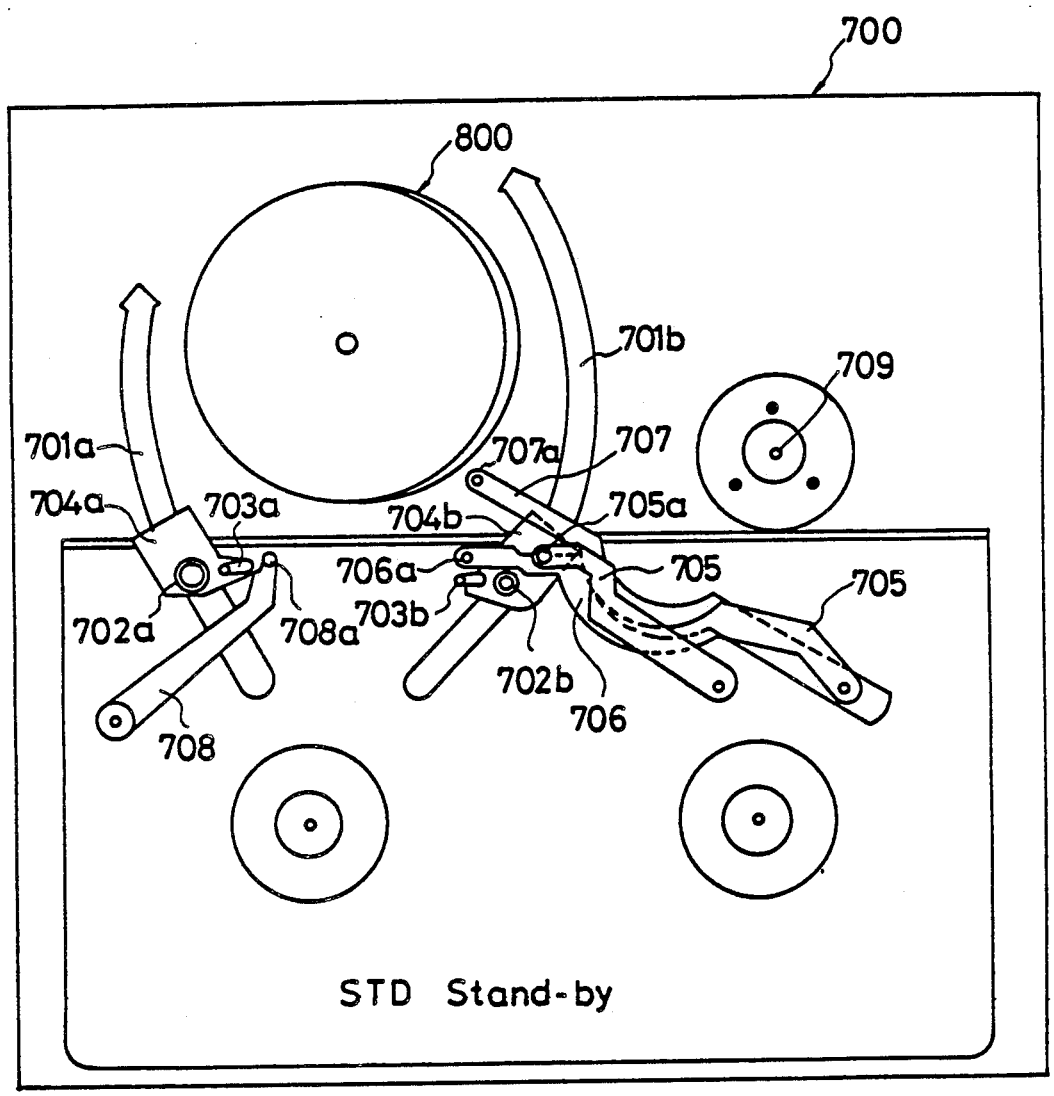
FIG.16 is a plan view similar to FIG.10 showing a second ready-for-loading state for the compact size tape cassette.

FIG.16 shows the STD STAND-BY state of the tape loading mechanism. In this state, the tape loading mechanism such as the base members 704a and 704b, and the arms 705–708 are moved to a state ready for drawing out the magnetic tape from the standard size tape cassette and for wrapping the magnetic tape around the guide drum 800. It should be noted that the poles 705a–708a at the end of the arms 705–708 are positioned so as to be accepted in the cutouts 2 and 3 of the standard size tape cassette 1 on the cassette tray 300 through the cutout 303 of the cassette tray. In this state, the sub-cam gear 717 is in a state further rotated in the counterclockwise direction, and the portion of the reflection patterns 719a, 719b and 719c indicated as STD STAND-BY is aligned with the horizontal row of the sensors SW6–SW8. Thus, the output of the sensor SW6 which does not face the reflection pattern 719a assumes a low level state while the outputs of the sensors SW7 and SW8 which face the reflection patterns 719a and 719b assume a high level state. In other words, the state of the detector 718 in the STD STAND-BY state shown in FIG.16 may be represented by (011).

Figure 17A:
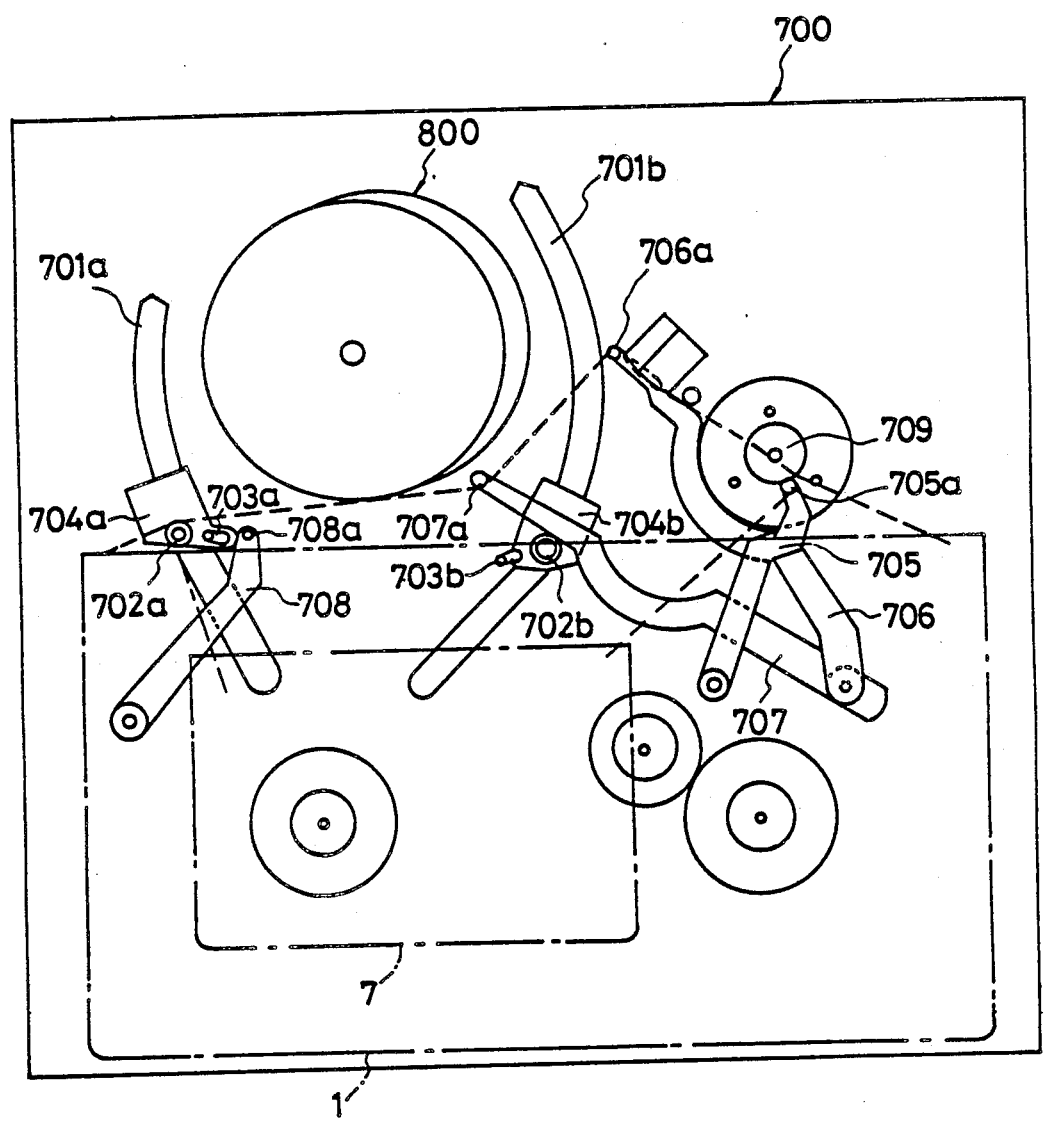
FIGS.17(A) and (B) are plan views similar to FIGS.10 and 16 showing a half loading state and a complete loading state.

FIG.17(A) shows the half loading state in which the magnetic tape makes tangential contact with the guide drum 800. This state is used for the STOP mode, the FAST FORWARD mode, and the REWIND mode. In this state, the motor 710 is further rotated and the tape loading mechanism is moved further in the direction of the drum 800. It can be seen that the poles 702a and 705a are used to draw out the magnetic tape from the compact size tape cassette 7 and the poles 702a and 706a are used to draw out the magnetic tape from the standard size tape cassette 1. In the drawing, the path of the magnetic tape is represented by a broken line. Further, the pole 707a prevents the magnetic tape from being wrapped around the drum 800. Responsive to this state, the sub-cam gear 717 is further rotated in the counterclockwise direction, and the sensors SW6–SW8 produce output signals as indicated by STOP/FF/REW in FIG.15.

Figure 17B:
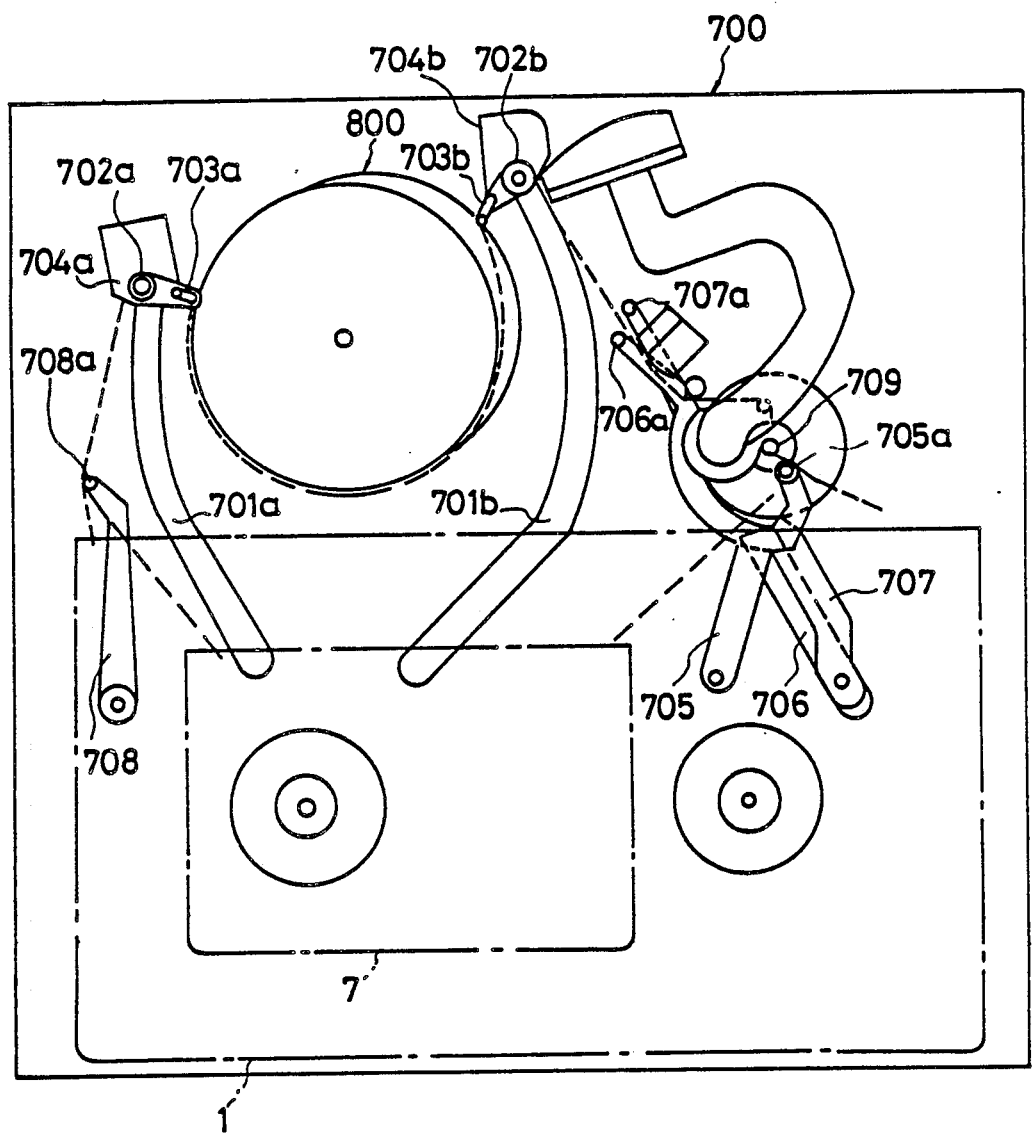

FIG.17(B) shows the fully loaded state in which the magnetic tape is wrapped around the drum 800 by the oblique poles 703a and 703b held on the base members 704a and 704b and the path of the magnetic tape is defined further by the poles 708a, 702a, 702b, 705a. FIG.17(B) further shows a capstan 709 and a pinch roller engaged with the capstan 709. In this state, the poles 706a and 707a are not engaged with the magnetic tape. Responsive to this state, the cam gear 717 is further rotated in the counterclockwise direction and the sensors SW6–SW8 produce the output signals responsive to the portion of the reflection patterns 719a, 719b and 719c indicated by Play/FFSearch as shown in FIG.15.

Figure 18:
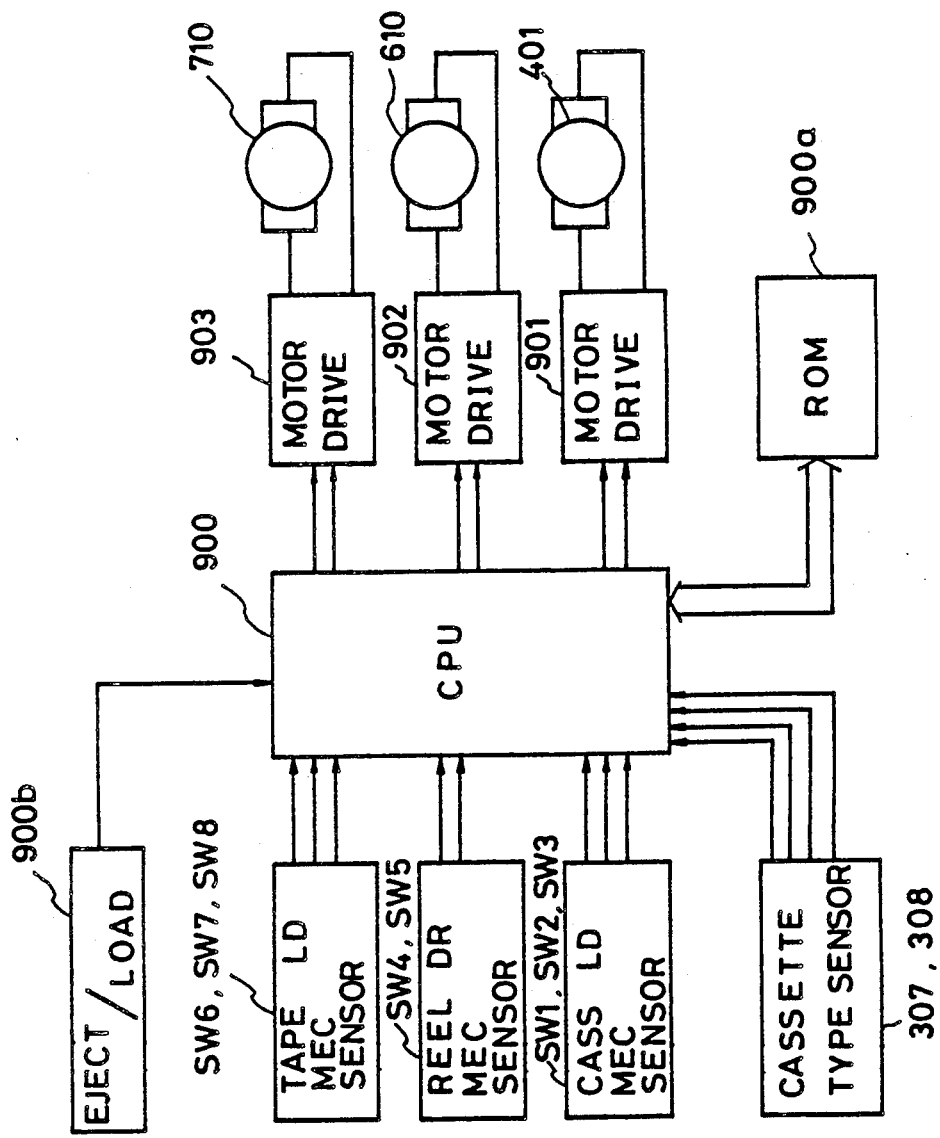
FIG.18 is a block diagram showing a controller for detecting the state of the cassette tray, the reel drive mechanism and the tape loading mechanism and for controlling drive motors used for driving these mechanisms.

It should be noted that the tape loading mechanism should assume the C STAND-BY state shown in FIG.10 when the compact size tape cassette is placed on the cassette tray 300 and is moved to the C state shown in FIG.3(C). Further, in the C STAND-BY state, the reel drive mechanism should be in the UP state shown in FIG.7(B). On the other hand, the tape loading mechanism should assume the STD STAND-BY state shown in FIG.16 when the standard size tape cassette is placed on the cassette tray 300 and is moved to the STD state shown in FIG.3(D). Further, in this STD STAND-BY state, the reel drive mechanism should be in the DOWN state shown in FIG.7(C). Furthermore, when the type of the tape cassette placed on the cassette tray 300 is changed, the state of the tape cassette loading mechanism, the state of the reel drive mechanism, and the state of the tape loading mechanism should be changed. As described at the beginning of this specification, it is desirable that the time required for the change in the state of each mechanism is sufficiently short so that the user of the video tape recorder does not notice any difference when the compact size tape cassette is loaded or the type of tape cassette is changed. FIG.18 shows a block diagram of a control system used for controlling the cassette loading mechanism, the reel drive mechanism and the tape loading mechanism. Referring to the drawing, the control system comprises a controller 900 which detects the state of the switches 307 and 308 for discriminating the type of the tape cassette placed on the cassette tray, the state of the optical sensors SW1–SW3 for detecting the state of the cassette loading mechanism, the state of the switches SW4 and SW5 for detecting the state of the reel drive mechanism, and the state of the switches SW6–SW8 for detecting the state of the tape loading mechanism and controls the motors 401, 610 and 710 through respective drive circuits 901–903. The controller 900 is a microcomputer and controls the motors 401, 610 and 710 according to a program stored in a memory 900a responsive to an EJECT key or LOAD key generally shown in FIG.18 by the reference numeral 900b.

Figure 19A:
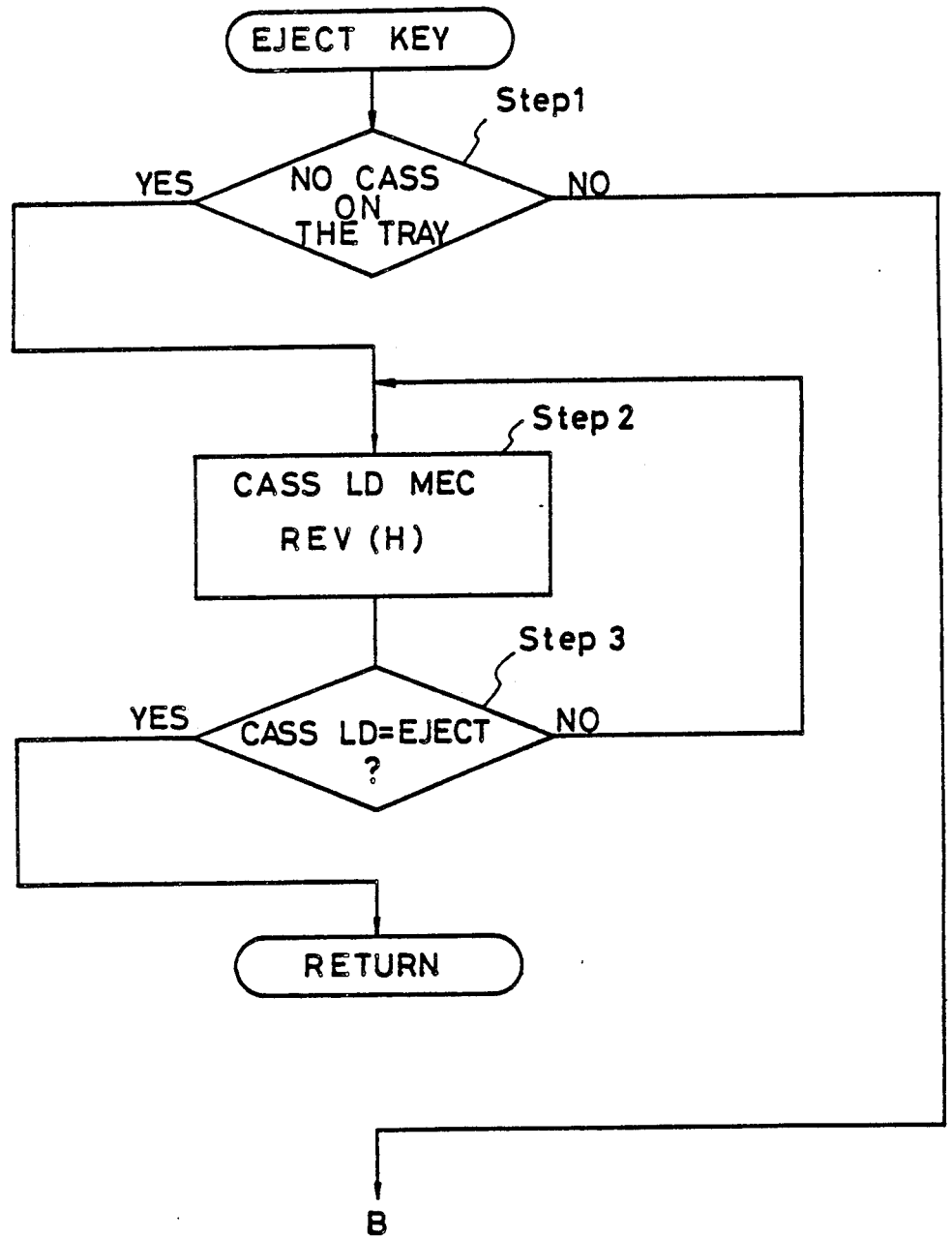
FIGS.19(A) and (B) are flowcharts showing the operation of the controller of FIG.18 when the cassette tray is to be ejected.
Figure 19B:
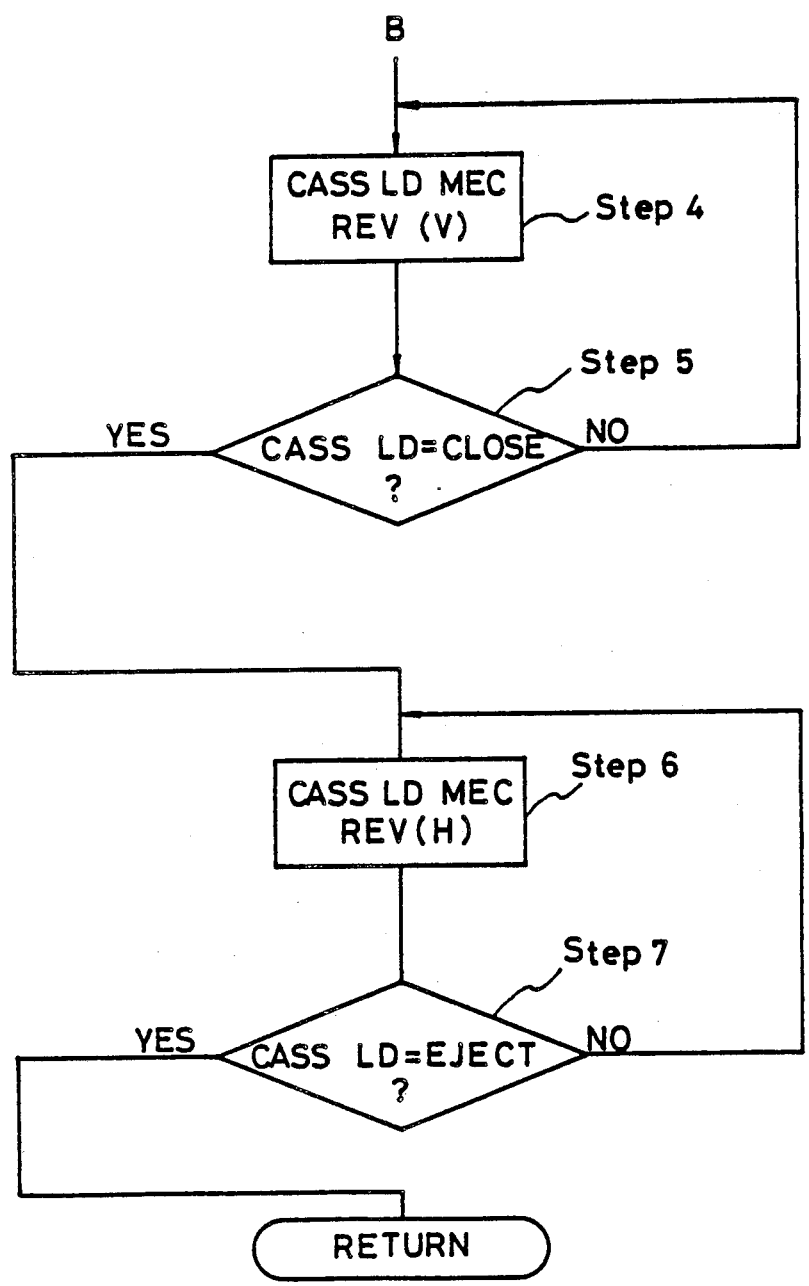

FIG.19(A)–(B) shows an example of the program used for ejecting the tape cassette in the tape cassette loading system described heretofore. Referring to the drawings, a discrimination is made in a step 1 as to whether or not a tape cassette is placed on the cassette tray 300, responsive to the operation of the EJECT key 900b. For this discrimination, the switches 307 and 308 provided on the cassette tray 300 are used. When no tape cassette is placed in the cassette tray, the cassette loading mechanism is driven horizontally in a reverse direction from the CLOSED state to the EJECT state until it is discriminated in a step 3 that the cassette loading mechanism has reached the EJECT state. When a tape cassette is placed on the cassette tray 300, the cassette loading mechanism is moved vertically in a reverse direction towards the CLOSED state in a step 4 until it is discriminated in a step 5 that the cassette loading mechanism has reached the CLOSED state in FIG.5. Following the step 5, a step 6 is performed in which the cassette loading mechanism is moved horizontally in the reverse direction until it is discriminated in a step 7 that the state of the cassette loading mechanism has reached the EJECT state.

According to this procedure, the cassette tray 300 is moved to the EJECT state in the shortest time when no tape cassette is placed on the cassette tray 300. It should be noted that the cassette loading system is in the CLOSED state when no cassette tray is placed on the cassette tray 300. On the other hand, the time taken for the cassette loading mechanism to reach the EJECT state is slightly longer when the tape cassette is placed on the cassette tray as it involves a vertical movement from the C state in FIG.3(C) or from the STD state in FIG.3(D). As the level of the tape cassette 300 is slightly lower in the STD state as compared to the C state, the time needed for ejection of the tape cassette is slightly longer in the standard size tape cassette than the time for the compact size tape cassette.

Figure 20A:
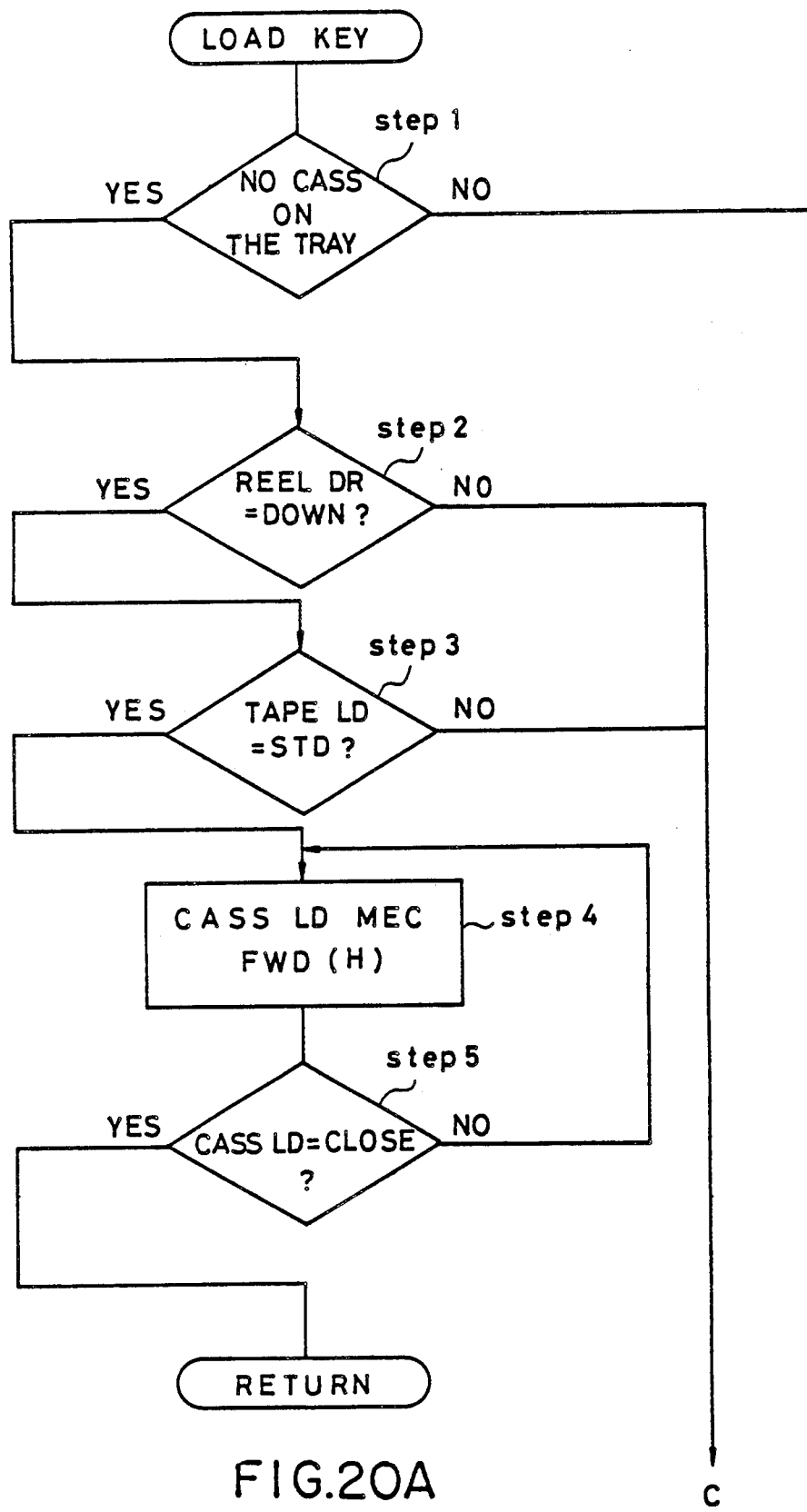
FIGS.20(A)-(H) are flowcharts showing the operation of the controller when the standard size tape cassette or the compact size tape cassette is loaded.
Figure 20B:
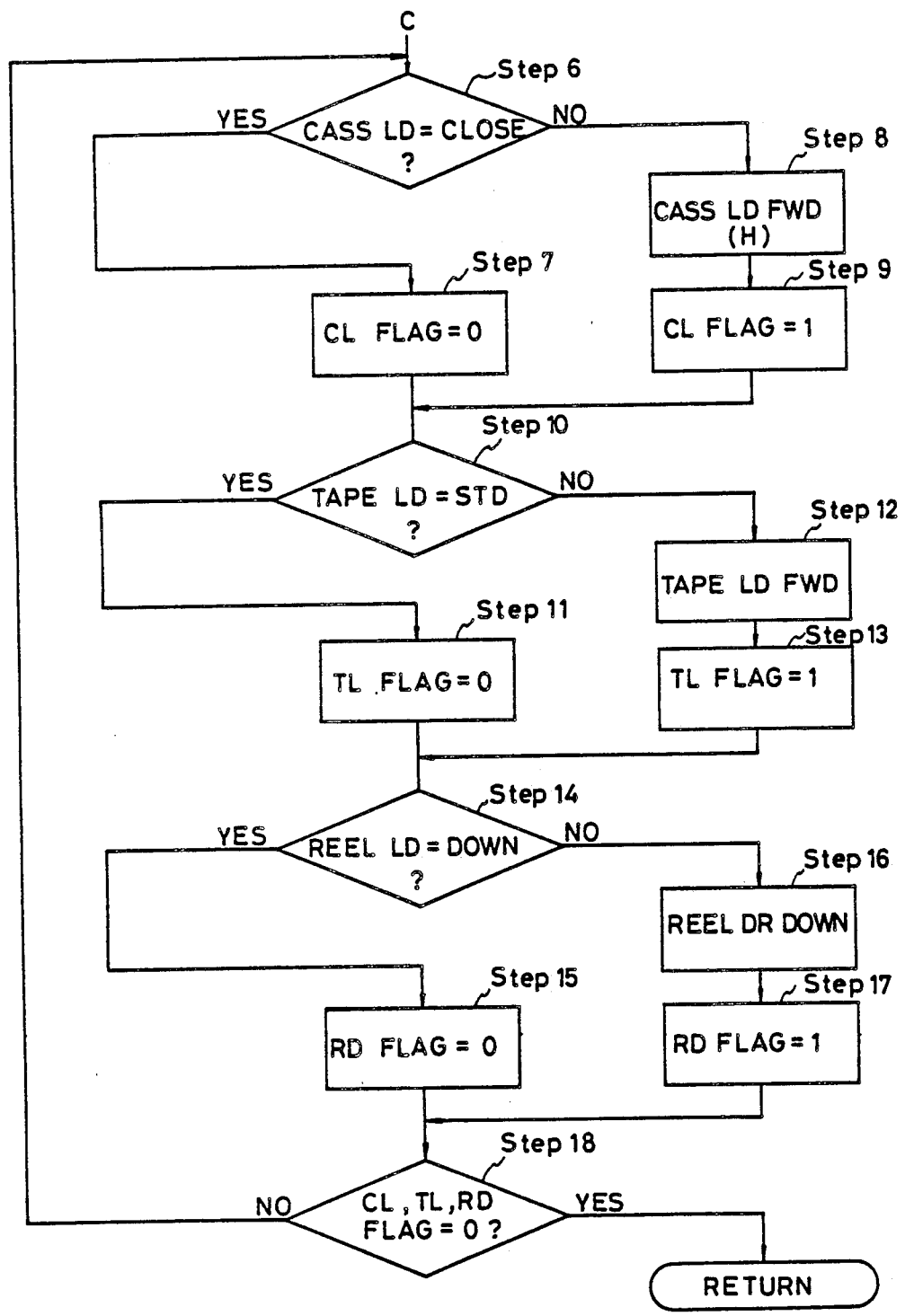

FIGS.20(A)–(H) show an example of the program for controlling the operation of the controller 900 when the LOAD key 900b is operated. Referring to FIG.20(A), it is discriminated in a step 1 whether a tape cassette is placed on the cassette tray 300 or not on the basis of the state of the switches 307 and 308 on the cassette tray 300. If no tape cassette was placed on the cassette tray 300, it is further discriminated whether the reel drive mechanism is in the DOWN state or not in a step 2 on the basis of the state of the switches SW4 and SW5. If the reel drive mechanism is in the DOWN state, it is further discriminated in a step 3 whether the tape loading mechanism is in the STD STAND-BY state or not. If the loading mechanism is in the STD STAND-BY state, the cassette loading mechanism is moved horizontally in a forward direction to the CLOSED state in a step 4 by energizing the motor 401 through the driver 901 until it is discriminated that the cassette loading mechanism has reached the CLOSED state in a step 5 on the basis of the state of the sensors SW1–SW3. If it is discriminated that the reel drive mechanism is not in the DOWN state in the step 2 or that the tape loading mechanism is not in the STD STAND-BY state in the step 3, on the other hand, it is further discriminated in a step 6 whether the cassette loading mechanism is in the CLOSED state or not on the basis of the state of the sensors SW1–SW3. If the result of the discrimination is YES, a CL FLAG indicating the state of the cassette loading mechanism is set to zero in a step 7 indicating that the cassette loading mechanism is already in the CLOSED state. On the other hand, if the result of the discrimination in the step 6 is NO, the motor 401 of the cassette loading mechanism is energized in a step 8 and the CL FLAG is set to 1 in a step 9 indicating that the cassette loading mechanism is not in the CLOSED state. Next, in a step 10, it is discriminated whether the tape loading mechanism is in the STD STAND-BY state or not on the basis of the state of the sensors SW6–SW8. If the result of the discrimination is YES, a TL FLAG indicating the state of the tape loading mechanism is set to 0 in a step 11 indicating that the tape loading mechanism is already in the STD STAND-BY state. On the other hand, if the result of the discrimination is NO, the motor 710 of the tape loading mechanism is energized in a step 12 and the TL FLAG is set to 1 in a step 13 indicating that the tape loading mechanism is not in the STD STAND-BY state. Next, in a step 14, it is discriminated whether the reel drive mechanism is in the DOWN state or not on the basis of the states of the switches SW4 and SW5. If the reel drive mechanism is in the DOWN state, an RD FLAG indicating the state of the reel drive mechanism is set to zero in a step 15 indicating that the reel drive mechanism is already in the DOWN state. On the other hand, if the reel drive mechanism is not in the DOWN state, the motor 610 of the reel drive mechanism is energized in a step 16 and the RD FLAG is set to 1 in a step 17 indicating that the reel drive mechanism is not in the DOWN state. Further, it is discriminated in a step 18 whether the CL FLAG, TL FLAG and RD FLAG are all zero or not. If the result of the discrimination is NO, the operations after the step 6 are repeated until all of these parameters become zero. As a result of the operation of the controller 900 described above, the reel drive mechanism is set to the DOWN state adapted for the standard size tape cassette, the tape loading mechanism is set to the STD STAND-BY state and the cassette loading mechanism is set to the CLOSED state responsive to the operation of the LOAD key when no tape cassette is placed on the cassette tray 300 and the tape cassette loading system is ready for the loading of the standard size tape cassette. As it is controlled by the program aforementioned such that the tape loading mechanism assumes the STD STAND-BY state when the reel drive mechanism is set to the DOWN state and that the tape loading mechanism assumes the C STAND-BY state when the reel drive mechanism is set to the UP state, the step 3 is not usually necessary. In the present controller 900, however, the step 3 is included so as to prevent damage to the tape cassette as well as to the tape cassette loading system in case the coordination in the movement of the reel drive mechanism and the tape loading mechanism is lost accidentally.

Figure 20C:
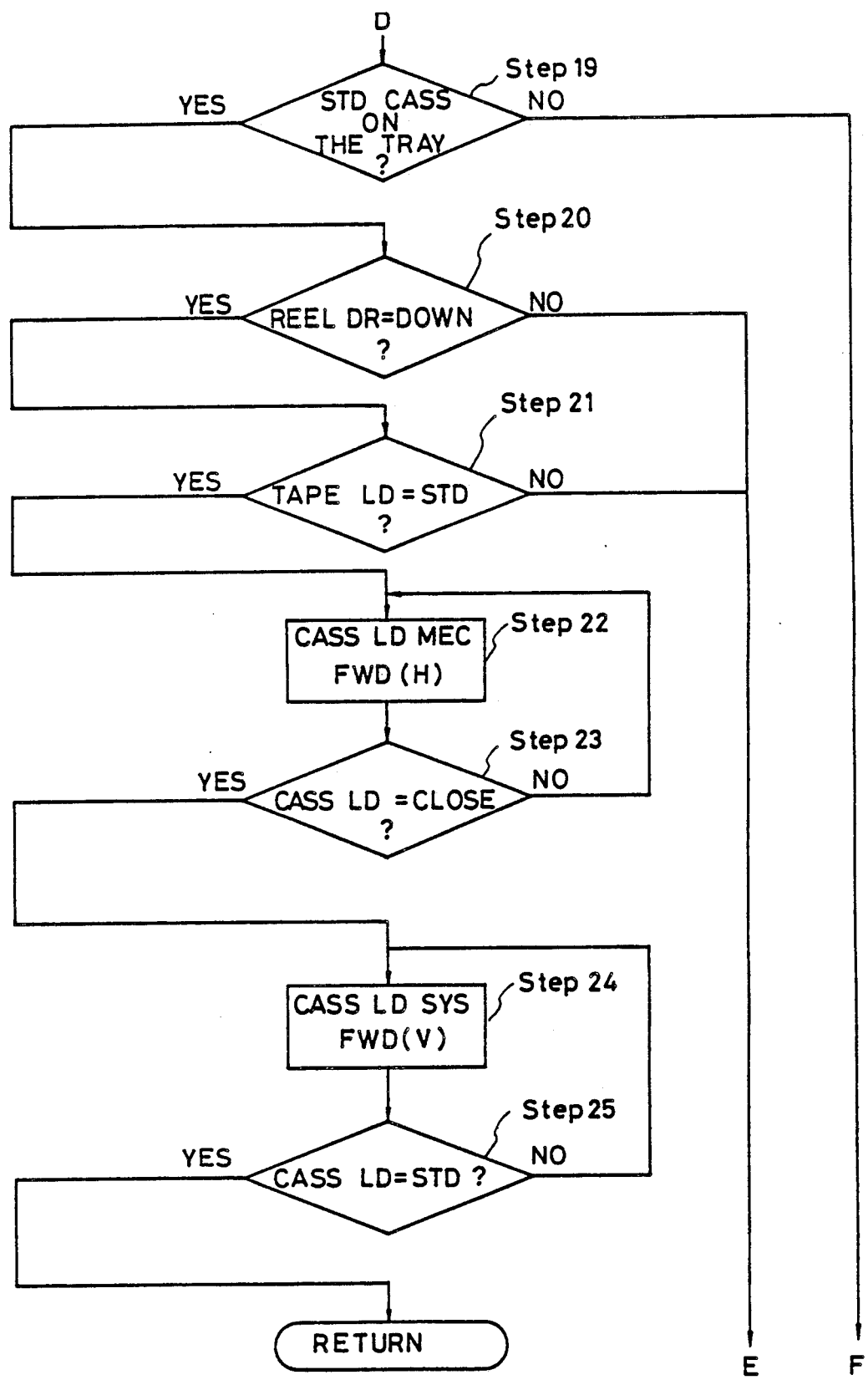
Figure 20:
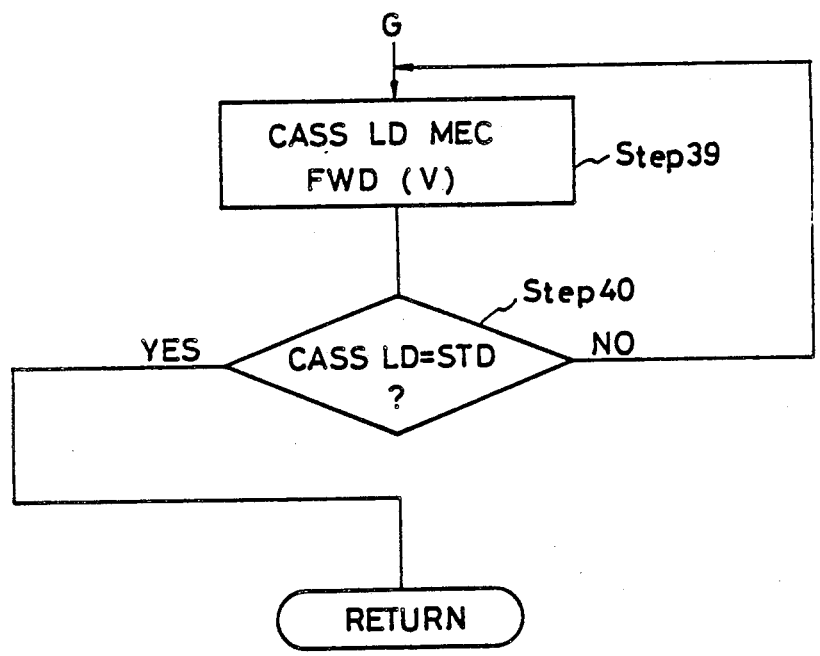
Figure 20:
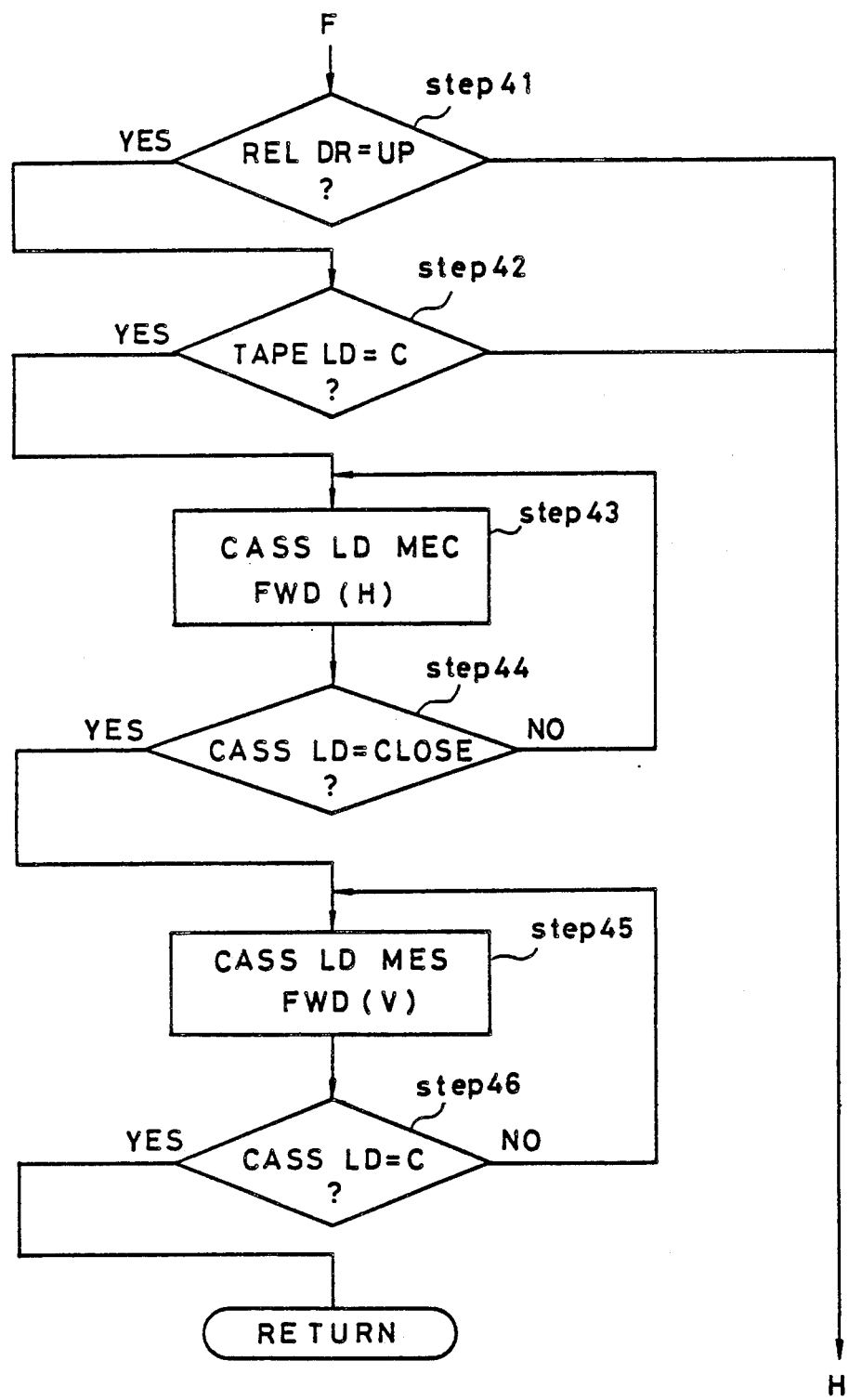
Figure 20:
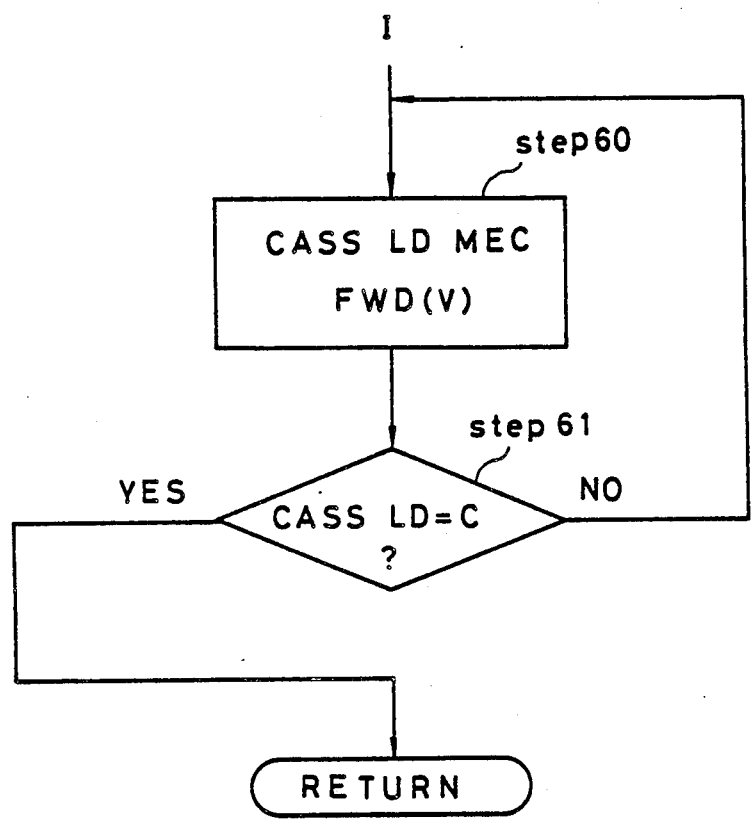

When it is discriminated in the step 1 that a tape cassette is placed on the cassette tray 300, it is further discriminated in a step 19 (FIG.20(C)) whether the tape cassette is the standard size tape cassette or the compact size tape cassette on the basis of the state of the switches 307 and 308. If the tape cassette is the standard size tape cassette, it is further discriminated in a step 12 whether the reel drive mechanism is in the DOWN state or not responsive to the state of the switches SW4 and SW5. If the result is YES, it is discriminated further in a step 21 whether the tape loading mechanism is in the STD STAND-BY state or not. If the result of the discrimination in the step 21 is YES, the cassette loading mechanism is moved horizontally in the forward direction in a step 22 until it is discriminated that the cassette loading mechanism has reached the CLOSED state in a step 23 on the basis of the state of the sensors SW1–SW3. Next, in a step 24, the cassette loading mechanism is moved vertically in the forward direction until it is discriminated in a step 25 that the cassette loading mechanism has reached the STD state on the basis of the state of the sensors SW1–SW3. As a result of the operation of the controller 900, the standard size tape cassette placed on the cassette tray 300 is moved to the STD state. In this state, the reel drive mechanism is already in the DOWN state adapted for the standard size tape cassette, and the tape loading mechanism is in the STD STAND-BY state.

When it is discriminated in the step 20 that the reel drive mechanism is not in the down state or it is discriminated in the step 21 that the tape loading mechanism is not in the STD STAND-BY state, it is discriminated in a step 26 whether the cassette loading mechanism is in the CLOSED state or not. If the result of the discrimination is YES, the CL FLAG is set to zero in a step 27. On the other hand, if the result of the discrimination in NO, the cassette loading mechanism is moved horizontally in a step 28 and the CL FLAG is set to one in a subsequent step 29. Next, it is discriminated in a step 30 whether the tape loading mechanism is in the STD STAND-BY state or not. If the result of the discrimination is YES, the TL FLAG is set to zero in a step 31. On the other hand, if the result of the discrimination in the step 30 is NO, the tape loading mechanism is moved in the forward direction in a step 32 and the TL FLAG is set to one in a subsequent step 33. Next, it is discriminated in a step 34 whether the reel drive mechanism is in the DOWN state or not. If the result of the discrimination is YES, the RD FLAG is set to zero in a step 35. On the other hand, if the result of the discrimination in the step 34 is NO, the reel drive mechanism is moved in the downward direction in a step 36 and the RD FLAG is set to one in a step 37. Furthers, it is discriminated in a step 38 if all the flags are zero or not in a step 38. If the result of the discrimination in the step 38 is NO, the operations from the step 26 are repeated until all the flags are set to zero. When all the flags are set to zero, the cassette loading mechanism is moved vertically in the forward direction until it is discriminated that the cassette loading mechanism has reached the STD state in a step 40. As a result of the aforementioned operation of the controller 900, the reel drive mechanism and the tape loading mechanism are moved to the state in which the standard size tape cassette and the standard size tape cassette placed on the cassette tray 300 have reached the STD state ready for loading the magnetic tape on the drum 800 of the video tape recorder.

When it is discriminated in the step 19 that the tape cassette on the cassette tray 300 is the compact size tape cassette, a discrimination is made in a step 41 whether the reel drive mechanism is in the UP state or in the DOWN state. If the reel drive mechanism is in the UP state, it is further discriminated in the step 42 whether the tape loading mechanism is in the C STANDARD state or not in a step 42. If the result of discrimination in the step 42 is YES, the cassette loading mechanism is moved horizontally in the forward direction in a step 43 until it is discriminated that the cassette loading mechanism has reached the CLOSED state in a step 44. Next, the cassette loading mechanism is moved vertically in the forward direction in a step 45 until it is discriminated in a step 46 that the cassette loading mechanism has reached the C state. As a result of this operation, the compact size tape cassette on the cassette tray 300 reaches the C state and the reel drive mechanism and the tape loading mechanism respectively assume the DOWN state and the C STAND-BY state adapted for the compact size tape cassette.

Further, when it is discriminated in the step 41 that the reel drive mechanism is not in the UP state, or when it is discriminated in the step 42 that the tape loading mechanism is not in the C STAND-BY state, it is discriminated in a step 47 whether the cassette loading mechanism is in the CLOSED state or not. If the result of discrimination is YES, the CL FLAG is set to zero in a subsequent step 48. On the other hand, if the result of discrimination is NO, the cassette loading mechanism is moved horizontally in the forward direction in a step 49 and the CL FLAG is set to one in a subsequent step 50. Next, it is discriminated in a step 51 whether the tape cassette loading mechanism is in the C STAND-BY state or not in a step 51. If the result of the discrimination is YES, the TL FLAG is set to zero in a step 52. On the other hand, if the result of the discrimination in the step 51 is NO, the tape loading mechanism is moved in the reverse direction in a step 53 and the TL FLAG is set to one in a step 53. It should be noted that the value zero of the TL FLAG in the steps 52 indicates that the tape loading mechanism is in the C STAND-BY state and that the value one of the TL FLAG in the step 54 indicates that the tape loading mechanism is not in the C STAND-BY state in contrast to the case in the steps 11 and 13 or in the steps 31 or 33. Next, it is discriminated in a step 55 whether the reel drive mechanism is in the DOWN state or not. If the result of the discrimination is YES, the RD FLAG is set to zero in a step 56. On the other hand, if the result of the discrimination in the step 55 is NO, the reel drive mechanism is moved in the upward direction in a step 57 and the RD FLAG is set to one in a step 58. Again, it should be noted that the value zero of the RD FLAG in the step 56 indicates that the reel drive mechanism is in the UP state and that the value one of the RD FLAG in the step 58 indicates that the reel drive mechanism is not in the UP state in contrast to the case in the steps 15 and 16 or in the steps 35 and 36. Further, it is discriminated in a step 59 whether all the flags are set to zero or not. If the result of the discrimination is NO, the steps from the step 47 are repeated until all the flags are set to zero. Next, the cassette loading mechanism is moved vertically in the forward direction until it is discriminated in a step 61 that the cassette loading mechanism has reached the C STAND-BY state. As a result of the aforementioned operation of the controller 900, the compact size tape cassette on the cassette tray 300 is moved to the C STAND-BY state and the reel drive mechanism and the tape loading mechanism are moved respectively to the UP state and to the C STAND-BY state even when these mechanisms are set to the state for the standard size tape cassette before the start of the loading operation. Further, it should be noted that the tape loading mechanism and the reel drive mechanism always are moved as a pair and the state of the tape loading mechanism and the state of the reel drive mechanism correspond as long as both of the mechanisms are in the stationary state. Thus, when the reel drive mechanism is in the DOWN state, the tape loading mechanism is in the STD STAND-BY state, and when the reel drive mechanism is in the UP state, the tape loading mechanism is in the C STAND-BY state.

FIG.21(A)-(C) show the state of the tape cassette loading system of the present invention as a result of the operation of the controller as shown in FIGS.19(A), (B) and FIGS.20(A)-(H). When the cassette loading mechanism is in the CLOSED state in which the carriage 200 is retracted into the body 20 of the video tape recorder without the tape cassette being placed on the cassette tray 300, the cassette tray 300 is held by the elevating member 403, and the reel drive mechanism and the tape loading mechanism are set to the DOWN state and the STD STAND-BY state. Responsive to the actuation of the EJECT key 900b, the controller 900 drives the motor 401 according to the step 2 of the program in FIG.19(A), and the cassette tray 300 is transported to the outside of the body 20 of the video tape recorder together with the carriage 200. As can be seen in FIG.1-9(A), the other motors 610 and 710 are not moved. Further, when the LOAD key 900b is actuated without placing the tape cassette on the cassette tray 300, it is discriminated in the step 2 whether or not the reel drive mechanism is in the DOWN state and further it is discriminated in the step 3 whether or not the tape loading mechanism is in the STD STAND-BY state. As the reel drive mechanism is in the DOWN state and the tape loading mechanism is in the STD STAND-BY state, the cassette loading mechanism alone is moved horizontally in the forward direction by the motor 401 in the step 4, and the cassette loading mechanism is returned to the CLOSED state. In the drawings, the movement of the mechanism is represented by the hatched area.

FIG.21(B) shows a situation in which the cassette loading mechanism without the tape cassette is moved to the EJECT state responsive to the actuation of the EJECT key and a standard size tape cassette is placed on the cassette tray 300 thus ejected. The operation of the cassette loading mechanism to the EJECT state from the CLOSED state is similar and the repetition of the description will be omitted. Responsive to the actuation of the LOAD key, the discriminations shown in the steps 19 –21 of FIG.20(C) are made, and the cassette loading mechanism is moved by the motor 401 horizontally in the forward direction to the CLOSED state and is further moved vertically in the forward direction to the STD state as shown in the steps 22 and 24 of FIG.20(C). Thus, the standard size tape cassette is moved to the STD state for loading the magnetic tape by the further movement of the tape loading mechanism. It should be noted that the tape loading mechanism and the reel drive mechanism are already in the STD STAND-BY state and in the DOWN state, so that the tape loading mechanism and the reel drive mechanisms are not moved in this operation.

FIG.21(C) shows a situation in which the cassette loading mechanism not carrying the tape cassette is ejected responsive to the actuation of the EJECT key and then a compact size tape cassette is placed on the cassette tray 300. The operation of the cassette loading mechanism responsive to the actuation of the EJECT key is identical to the operation previously described and the repetition of the description will be omitted. Responsive to the actuation of the LOAD key, the discriminations in the step 19 in FIG.20(C) and in the step 41 in FIG.20(F) are made. Because the tape cassette placed on the cassette tray 300 is the compact size tape cassette, the reel drive mechanism is in the DOWN state, and the tape loading mechanism is in the STD STAND-BY state, the procedures in the steps 47-59 in FIG.20(G) are carried out and the cassette loading mechanism, the tape loading mechanism and the the reel drive mechanism are moved simultaneously by energizing the motors 401, 610 and 710. When the movement of the mechanisms in the steps 47-59 is completed, the step 60 in FIG.20(H) is performed and the compact size tape cassette is moved to the C state by the motor 401. It should be noted that the reel drive mechanism is in the UP state and that the tape loading mechanism is in the C STAND-BY state when the aforementioned movement of the mechanisms is completed. Thus, the compact size tape cassette assumes a position ready for loading the magnetic tape by further movement of the tape loading mechanism.

Figure 22A:
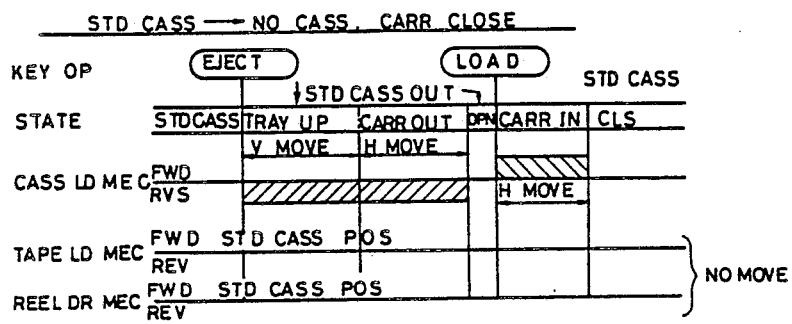
FIGS.22(A)-(C) are diagrams similar to FIGS.21(A)-(C) showing the various states of the tape cassette loading system of the present invention.

FIG.22(A) shows a situation in which a standard size tape cassette held by the cassette loading mechanism at the STD state is ejected responsive to the actuation of the EJECT key and the LOAD key is actuated without placing a tape cassette on the cassette tray. As there is a tape cassette on the cassette holder, the step 4 shown in FIG.19(B) is performed after the discrimination step 1 in FIG.19(A) and the cassette loading mechanism is moved upwards to the CLOSED state by the energization of the motor 401. Further, after arriving at the CLOSED state, the cassette loading mechanism is moved horizontally to the EJECT state by the motor 401. Thus, the cassette tray 300 is moved to the outside of the body 20 of the video tape recorder as shown in FIG.3(A) and the user can remove the tape cassette from the cassette tray 300. Next, responsive to the actuation of the LOAD key without placing the tape cassette on the cassette tray 300, the discrimination in the step 1 in FIG.20(A) is made and thereafter the discriminations in the steps 2 and 3 are made. As the standard size tape cassette is played in the previous operational mode of the video tape recorder, the tape loading mechanism and the reel drive mechanism are in the DOWN state and in the STD STAND-BY state, respectively. Thus, the cassette loading mechanism is moved horizontally in the step 4 in the forward direction and the operation is completed when the cassette loading mechanism has reached the CLOSED state.

Figure 22B:
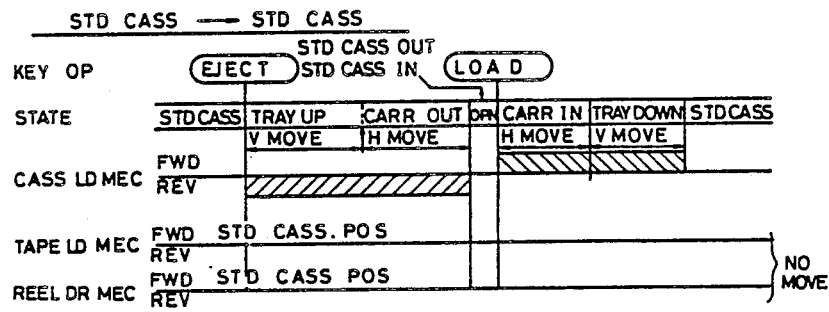

FIG.22(B) shows a situation in which a standard size tape cassette played previously in the video tape recorder is removed and a new standard size tape cassette is placed on the cassette tray. In the drawing, the part representing the ejection of the tape cassette is identical to the procedure already described with reference to FIG.20(A) and the repetition of the description will be omitted. Responsive to the actuation of the LOAD key, the step 1 in FIG.20(A) is carried out and thereafter the discrimination in the step 19 in FIG.20(C) is made as to whether or not the tape cassette is the standard size tape cassette and the discrimination in the step 20 is made as to whether the reel drive mechanism is in the UP state or in the DOWN state. Further, the discrimination is made in the step 20 as to whether or not the tape loading mechanism is in the STD STAND-BY state. As the video tape recorder previously played the standard size tape cassette, the reel drive mechanism and the tape loading mechanism are already in the UP state and in the STD STAND-BY state. Thus, the steps 22 and 24 are performed and the cassette loading mechanism is moved first horizontally t the CLOSED state and then vertically to the STD state. In this operation, it is not necessary to move the tape loading mechanism and the reel drive mechanism as they are already in the DOWN state and in the STD STAND-BY state. Thus, the standard size tape cassette assumes a position ready for loading the magnetic tape by the further movement of the tape loading mechanism.

Figure 22C:
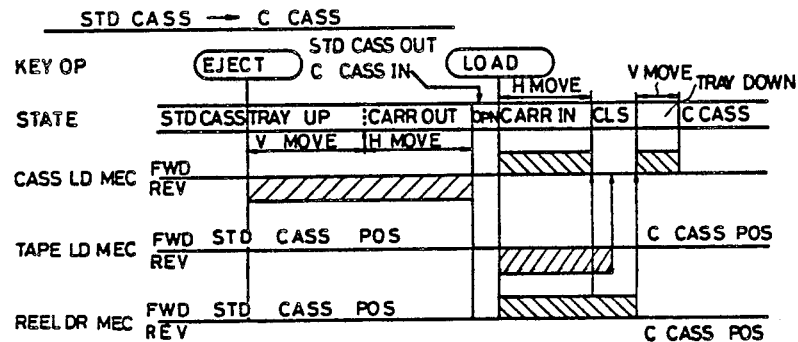

FIG.22(C) shows a situation in which a standard size tape cassette played previously is ejected and a compact size tape cassette is newly placed on the cassette tray. As the operation of ejection of the tape cassette is identical to the operation already described with reference to FIGS.22(A) and (B), the repetition of the description for that part will be omitted. Responsive to the placement of the compact size tape cassette and the actuation of the LOAD key, the discrimination in the step 20 in FIG.20(C) is made after the discriminations in the step 1 (FIG.20(A)) and the step 19. As the reel drive mechanism and the tape loading mechanism are still in the DOWN state and the STD STAND-BY state in correspondence with the previously played standard size tape cassette, the steps 47–59 are performed next. Thus, the cassette loading mechanism, the tape loading mechanism and the reel drive mechanism respectively are moved simultaneously to the CLOSED state, to the C STAND-BY state and to the UP state. When the movement of the mechanisms is completed, the cassette loading mechanism is moved further in the step 60 to the C state. Thus, the compact size tape cassette assumes a state ready for loading the magnetic tape by the further movement of the tape loading mechanism.

FIG.23(A) shows a situation in which a previously played compact size tape cassette is removed from the cassette tray and the LOAD key is actuated without placing a new tape cassette on the cassette tray. Responsive to the EJECT key, the cassette loading mechanism is moved first vertically in the reverse direction to the CLOSED state according to the step 5 shown in FIG.19(B). Next, the cassette loading mechanism is moved horizontally in the reverse direction according to the step 6 in FIG.19(B) until it reaches the EJECT state. During this movement of the cassette loading mechanism, the tape loading mechanism and the reel drive mechanism are not moved. In other words, the tape loading mechanism and the reel drive mechanism are respectively in the C STAND-BY state and the UP state for the compact size tape cassette previously played Further, responsive to actuation of the LOAD key without placing a tape cassette on the cassette tray 300, the steps 6–18 shown in FIG.20(A) are performed and the cassette loading mechanism, the tape loading mechanism and the reel drive mechanism are moved simultaneously in the forward direction to the CLOSED state, to the STD STAND-BY state and to the DOWN state respectively. Thus, the cassette loading mechanism, the tape loading mechanism and the reel drive mechanism are set to the state for the standard size tape cassette when the LOAD key is actuated without placing a tape cassette on the cassette tray 300.

FIG.23(B) shows the operation of the tape cassette loading system of the present invention in which a compact size tape cassette previously played by the video tape recorder is ejected and a standard size tape cassette is newly placed on the cassette tray. Responsive to the EJECT key, the cassette loading mechanism is moved vertically and then horizontally as already described with reference to FIG.20(A). Again, the tape loading mechanism and the reel drive mechanism are set to the C STAND-BY state and to the UP state in correspondence with the compact size tape cassette previously played. Responsive to the actuation of the LOAD key after the removal of the compact size tape cassette from the cassette tray 300 and the placement of the standard size tape cassette on the cassette tray, the steps 26–38 shown in FIG.20(D) are performed and the cassette loading mechanism, the tape loading mechanism and the reel drive mechanism are moved simultaneously to the CLOSED state, to the STD STAND-BY state and to the DOWN state respectively. When the movement of the mechanisms is completed, the cassette loading mechanism is thereafter moved vertically from the CLOSED state to the STD state according to the step 39 in FIG.20(E).

FIG.23(C) shows a situation in which a compact size tape cassette previously played by the video tape recorder is removed and another compact size tape cassette is newly played. Responsive to the actuation of the EJECT key, the cassette loading mechanism is moved vertically to the CLOSED state and then horizontally to the EJECT state according to the steps 4 and 6 in FIG.19(B) similarly to the case previously described with reference to FIGS. 23(A) and (B). Again, the tape loading mechanism and the reel drive mechanism are set to the C STAND-BY state and to the UP state for the compact size tape cassette. Responsive to the actuation of the LOAD key after the placement of the tape cassette on the cassette tray 300, the cassette loading mechanism is moved horizontally from the EJECT state to the CLOSED state and then from the CLOSED state to the C state according to the steps 43 and 45 shown in FIG.20(F). As the tape loading mechanism and the reel drive mechanism are already in the state for the compact size tape cassette, these mechanisms are not moved in this operation.

As can be seen in FIGS.21(C), 22(C), 23(A) and 23(B), the cassette loading mechanism, the tape loading mechanism and the reel drive mechanism are changed in state simultaneously when type of the tape cassette to be played is changed (FIGS.21(C), 22(C) and 23(B)) or when the tape cassette loading system is initialized as in FIG.23(A). Thus, the time needed for loading a tape cassette wherein a change occurs in the state of the mechanisms is not substantially different from the time needed for loading the tape cassette with no change in the state of the mechanisms. Thus, the user does not experience a long waiting time for changing the state of the tape loading mechanism and the reel drive mechanism when type of the tape cassette to be played is changed.

Figure 24:
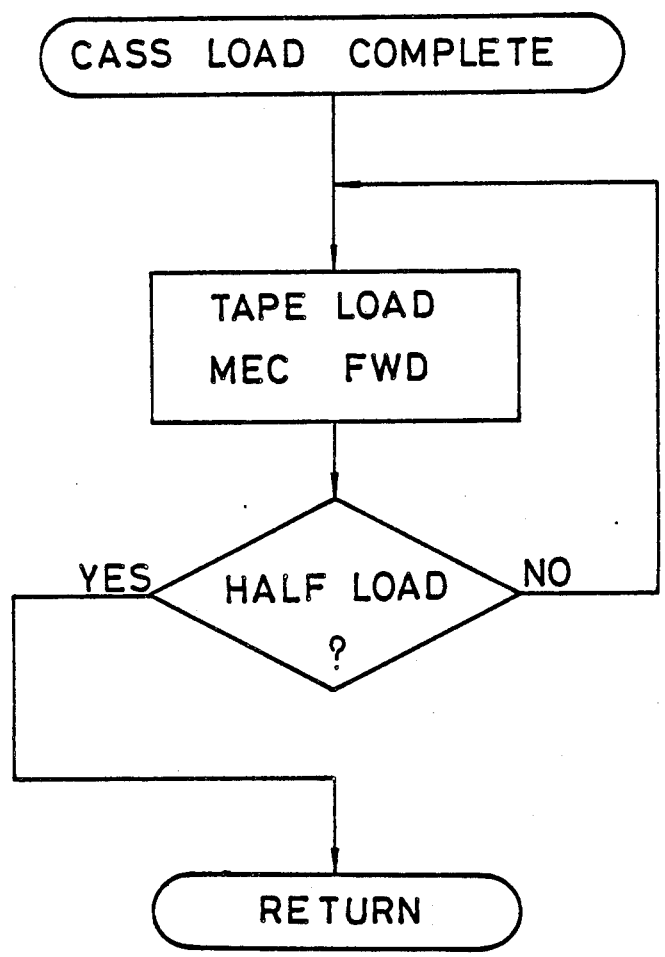
FIGS.24(A) and (B) are flowcharts showing another example of the operation of the tape cassette loading system of the present invention.
Figure 24:
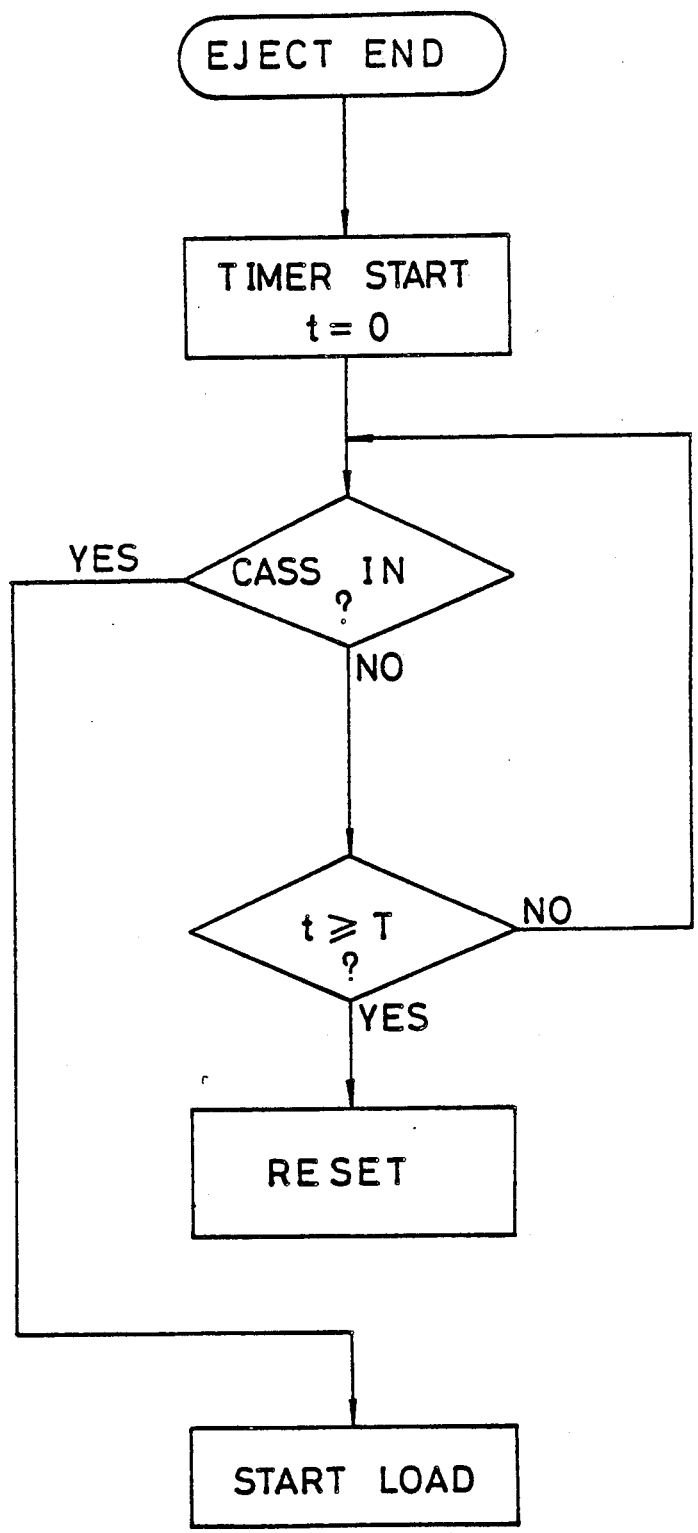

FIG.24(A) shows a modification of the operation of the controller 900. In this operation, the controller moves the tape loading mechanism further in the forward direction to the half loading state shown in FIG.1-

7(A) when the tape cassette loading procedure as shown in FIGS.20(A)–(H) is completed.

FIG.24(B) shows another modification of the operation of the controller 900 in which a timer is started after the completion of the EJECT procedure. When the tape cassette is not placed on the cassette tray 300 within a predetermined time period T, the operations in the steps 1–10 in FIGS.20(A) and (B) are performed in the RESET procedure in the drawing, and the state of the cassette loading mechanism, the reel drive mechanism and the tape loading mechanism is initialized. When the tape cassette is placed during the time interval T, the loading procedure as shown in FIGS.20(C)–(H) is performed.

Further present invention is not limited to those embodiments described heretofore but various variations and modifications may be made without departing from the scope of the present invention.

What is claimed is:

1. A tape cassette loading system of a magnetic recording and reproducing apparatus for loading and unloading a magnetic tape contained in a tape cassette on and from a guide drum of the magnetic recording and reproducing apparatus carrying magnetic heads comprising:

cassette loading means adapted for holding a first tape cassette having a first size and further adapted for holding a second tape cassette having a second size smaller than said first size, said cassette loading means assuming successively a first state in which the tape cassette held on the cassette loading means is located substantially outside of a body of the magnetic recording and reproducing apparatus, a second state in which the tape cassette held on the cassette loading means is located fully inside the body of the magnetic recording and reproducing apparatus at a level substantially the same as the level of the tape cassette in said first state of the cassette loading means, a third state immediately below the second state in which the magnetic tape in the second tape cassette is ready for loading on the guide drum, and a fourth state further below said third state in which the magnetic tape in the first tape cassette is ready for loading on the guide drum of the apparatus;

first driving means driven by a motor and which is movable between first, second, third and fourth positions for driving said cassette loading means between said first state and said second state, between said second state and said third state and between said third state and said fourth state, said first position, second position, third position and fourth position of said first driving means respectively corresponding to said first state, second state, third state and fourth state of said cassette loading means;

reel drive means carrying a first reel disk for driving a supply reel of the first or second tape cassette held on the cassette loading means, a second reel disk for driving a take up reel of the first tape cassette, and a third reel disk for driving a take up reel of the second tape cassette held on the cassette loading means, said reel drive means assuming a first state in which said second reel disk is in a position for engagement with the first tape cassette held on the cassette loading means and a second state in which said third reel disk is in a position for engagement with the second tape cassette held on the cassette loading means;

second driving means driven by a motor and is movable between a first position and second position for driving said reel drive means between said first state and second state respectively corresponding with said first and second positions of said second driving means;

tape loading means disposed at a vicinity of the guide drum between the guide drum and the cassette loading means and carrying a plurality of members which are movable for drawing out the magnetic tape from the first tape cassette when said first tape cassette is held on the cassette loading means or for drawing out the magnetic tape from the second tape cassette when said second tape cassette is held on the cassette loading means, said members being movable between a first state for engagement with the magnetic tape in the first tape cassette on the cassette loading means and a second state for engagement with the magnetic tape in the second tape cassette on the cassette loading means;

third driving means driven by a motor and which is movable between a first position and a second position for driving said plurality of members between said first state and said second state respectively in correspondence with said first and second positions of the third driving means;

first detection means for detecting the placement of the tape cassette on the cassette loading means and for producing an output signal indicating the type of the tape cassette placed thereon indicating whether the tape cassette is the first tape cassette or the second tape cassette;

second detection means for producing an output signal indicating the state of the cassette loading means by detecting the position of the first driving means;

third detection means for producing an output signal indicating the state of the reel drive means by detecting the position of the second driving means;

fourth detection means for producing an output signal indicating the state of the tape loading means by detecting the position the third driving means; and a controller electrically connected to an operation key of the magnetic recording and reproducing apparatus to be operated by a user for receiving a command from the user, said controller being further connected to said first, second, third and fourth detection means for receiving the output signals from the first, second, third and fourth detection means and discriminating the type of the tape cassette on the cassette loading means and the state of the cassette loading means, reel drive means and the tape loading means on the basis of said output signals, said controller further connected to the motors of said cassette loading means, reel drive means and tape loading means for controlling the energization of the motors responsive to the output signals from the first, second, third and fourth detection means so that the state of the cassette loading means is changed from said first state to said fourth state successively passing through said second and third states, that the state of the reel drive means is set to said first state of the reel drive means, and that the state of the tape loading means is set to said first state of the tape loading means responsive to the command by the user commanding the loading of the tape cassette when it is discriminated in said first detection means that the first tape cassette is placed on the cassette loading means, said controller further controlling the energization of the motors of said first, second and third driving means on the basis of the output signals from said first, second, third and fourth detection means so that the state of the cassette loading means is changed from said first state to said third state after passing through said second state, that the reel drive means is set to said second state of the reel drive means, and that the tape loading means is set to said second state of the tape loading means responsive to the command by the user commanding the loading of the tape cassette when it is discriminated that the second tape cassette is placed on the cassette loading means on the basis of the output signal from said first detection means, said controller further controlling the energization of the motors of said first, second and third driving means on the basis of the output signals from said first, second, third and fourth detection means so that the state of the cassette loading means is changed to said first state from said fourth state successively passing through said third and second states responsive to the command by the user commanding the unloading of the tape cassette when the cassette loading means is in the fourth state, and that the state of the cassette loading means is changed to said first state from said third state after passing through said second state responsive to the command by the user commanding the unloading of the tape cassette when the cassette loading means is in the third state.

2. A tape cassette loading system as claimed in claim 1 in which said third driving means comprises a main gear carrying a reflection pattern for discrimination of the angle of rotation of the main gear, and a plurality of sensors disposed for receiving the reflection from the reflection pattern on the main gear.

3. A tape cassette loading system as claimed in claim 1 in which said controller discriminates the existence of the tape cassette on the cassette loading means on the basis of the output signals of the first detection means responsive to the command by the user commanding the loading of the tape cassette and energizing the motor of the first driving means, such that the state of the cassette loading system is set to the second state when it is discriminated that no tape cassette is placed on the cassette loading means.

4. A tape cassette loading system as claimed in claim 1 in which said controller further sets the state of the reel drive means to its first state by controlling the energization of the motor of the second driving means and sets the state of the tape loading means to its first state by controlling the energization of the motor of the third drive means responsive to the command of the user commanding the loading of the tape cassette when it is discriminated on the basis of the output signals from said first detection means that no tape cassette is placed on the cassette loading system.

5. A tape cassette loading system as claimed in claim 1 in which said controller controlling the energization of the motors of the first driving means, the second driving means and the third driving means energizes the motors of the first, second and third driving means simultaneously responsive to the command by the user commanding the loading of the tape cassette when a change in the state is to be made in the tape loading means and in the reel drive means at the time of setting the state of the tape loading means and the reel drive means responsive to the result of discrimination made in the first detection means.

6. A tape cassette loading system as claimed in claim 1 in which said change in the state of the reel driving means and the tape loading means is made during a time interval in which the state of the cassette loading means is changed from its first state to second state.

7. A tape cassette loading system as claimed in claim 1 in which said tape loading means is further movable from said second state to a third state in which said members are moved further such that the magnetic tape contained in the tape cassette and drawn out by the members makes a tangential contact with the guide drum of the magnetic recording and reproducing apparatus, said third driving means being driven to a third position corresponding to said third state of the tape loading means, said controller controlling said third driving means so as to move to said third position after the cassette loading means has reached its fourth state when the user commanded the loading of the tape cassette and the cassette loading means is carrying the first tape cassette, said controller controlling said third driving means to said third position after the cassette loading means has reached its third state when the user commanded the loading of the tape cassette and the cassette loading means is carrying the second tape cassette.

8. A tape cassette loading system as claimed in claim 1 in which said controller starts a timer when the change in the state of the tape loading means to said first state is completed responsive to the command by the user commanding the unloading of the tape cassette, said controller further starting the change in state of the cassette loading system to its second state, the setting of the state of the reel driving system to its first state, and the setting of the state of the tape loading system to its first state simultaneously when it is discriminated that no tape cassette is placed on the cassette loading means within a predetermined time period on the basis of the output signals from said first detection means.

9. A tape cassette loading system as claimed in claim 1 in which said reel drive means comprises a main frame on which the first reel disk and the second reel disk are carried and a sub-frame on which the third reel disk is carried, said sub-frame is held on an end of a swing arm which is driven by a rotary shaft connected to said second driving means such that the sub-frame is lowered relative to the main frame when the reel drive means is in the first state and that the sub-frame is raised relative to the main frame when the reel drive means is in the second state.

10. A tape cassette loading system as claimed in claim 9 in which said second detection means comprises a first switch which is closed when the sub-frame is in the lowered state and opened when the sub-frame is in the raised state and a second switch which is opened when the sub-frame is in the lowered state and closed when the sub-frame is in the raised state. first state from said fourth state successively passing through said third and second states responsive to the command by the user commanding the unloading of the tape cassette when the cassette loading means is in the fourth state, and that the state of the cassette loading means is changed to said first state from said third state after passing through said second state responsive to the command by the user commanding the unloading of the tape cassette when the cassette loading means is in the third state.

11. A tape cassette loading system as claimed in claim 1 in which said cassette loading means comprises a housing fixed on the body of the magnetic recording and reproducing apparatus, a carriage carried on the housing in a manner movable horizontally between a first and a second state respectively corresponding to said first state and said second state of the cassette loading means, and a cassette tray supported on the carriage in a manner movable in a vertical direction between a first level corresponding to the level of the tape cassette held on the cassette loading means when the cassette loading means is in said first and second states, a second level corresponding to the level of the tape cassette held on the cassette loading means when the cassette loading means is in said third state, and a third level corresponding to the level of the tape cassette held on the cassette loading means when the cassette loading means is in said fourth state by means of a link mechanism, said cassette tray being a generally rectangular tray member adapted to hold the first tape cassette and further having a generally rectangular depressed part adapted for holding the second tape cassette.

12. A tape cassette loading system as claimed in claim 11 in which said first detection means comprises a first switch carried on the tray member such that the switch is closed when the first tape cassette is placed on the cassette tray and a second switch carried on the depressed part such that the switch is closed when the second tape cassette is placed on the cassette tray.

13. A tape cassette loading system as claimed in claim 11 in which said first drive means comprises a gear system for moving the carriage horizontally and for moving the cassette tray vertically, said gear system including a main gear carrying a reflection pattern for discriminating an angle of rotation of the main gear, a tooth provided on a circumference of the main gear for a limited angular range for driving the carriage responsive to a rotation the main gear for a limited rotational angle, a cam gear meshing with the main gear and carrying a cam groove comprising a concentric cam groove part and a spiral cam groove part, and a swing lever having a portion engaged with said cam groove for selectively moving the cassette tray vertically responsive to rotation of the main gear for a limited rotational angle.

14. A tape cassette loading system as claimed in claim 13 in which said second detection means comprises a set of optical sensors disposed so as to face the reflection pattern on the main gear.

* * * * *